(12) United States Patent  (10) Patent No.: US 7,512,552 B2
Karas et al.                (45) Date of Patent:     Mar. 31, 2009

(54) ELECTRONIC GIFT LINKING

(75) Inventors: Peter M. Karas, Franktown, CO (US); James Everett Cowell, Littleton, CO (US); Henry M. Abelman, Roswell, GA (US); Mark Thompson, Denver, CO (US)

(73) Assignee: The Western Union Company, Englewood, CO (US)

( * ) Notice: Subject to any disclaimer, the term of this patent is extended or adjusted under 35 U.S.C. 154(b) by 224 days.

(21) Appl. No.: 11/531,030

(22) Filed: Sep. 12, 2006

(65) Prior Publication Data

US 2007/0011060 A1    Jan. 11, 2007

Related U.S. Application Data

(63) Continuation of application No. 10/313,934, filed on Dec. 5, 2002, now Pat. No. 7,130,817, which is a continuation-in-part of application No. 10/010,068, filed on Dec. 6, 2001, now Pat. No. 7,266,533, which is a continuation-in-part of application No. 09/737,912, filed on Dec. 15, 2000, now abandoned.

(60) Provisional application No. 60/256,127, filed on Dec. 15, 2000.

(51) Int. Cl.
    *G06Q 30/00* (2006.01)
(52) U.S. Cl. ...................................... 705/26
(58) Field of Classification Search .................. 705/26, 705/27
    See application file for complete search history.

(56) References Cited

U.S. PATENT DOCUMENTS

| 3,599,151 | A | 8/1971 | Harr |
| 3,783,755 | A | 1/1974 | Lagin |
| 3,833,395 | A | 9/1974 | Gosnell |
| 4,032,931 | A | 6/1977 | Haker |
| 4,321,672 | A | 3/1982 | Braun et al. |
| 4,454,414 | A | 6/1984 | Benton |
| 4,562,340 | A | 12/1985 | Tateisi et al. |
| 4,562,341 | A | 12/1985 | Ohmae et al. |

(Continued)

FOREIGN PATENT DOCUMENTS

EP    0 481 135 A1    4/1992

(Continued)

OTHER PUBLICATIONS

Bill Husted, "E-cards perfect for the forgetful", The Atlanta Journal the Atlanta Constitution. Atlanta, Ga.: Nov. 28, 1999. p. H.3☐☐http://proquest.umi.com/pqdweb?did=46684081&sid=3 &Fmt=3&clientId=19649&RQT=309&VName=PQD.*

(Continued)

*Primary Examiner*—Jeffrey A. Smith
*Assistant Examiner*—Mila Airapetian
(74) *Attorney, Agent, or Firm*—Townsend and Townsend and Crew LLP

(57) ABSTRACT

According to the invention, a method for creating an electronic greeting card that references a gift is disclosed. In one step, a selection of the electronic greeting card is received from a sender of that greeting card. Identification of the gift is received. A code indicative of the gift is created, whereby the code facilitates retrieving information about the gift. The code is embedded in the electronic greeting card.

28 Claims, 18 Drawing Sheets

U.S. PATENT DOCUMENTS

| | | | |
|---|---|---|---|
| 4,630,200 A | 12/1986 | Ohmae et al. | |
| 4,678,895 A | 7/1987 | Tateisi et al. | |
| 4,722,554 A | 2/1988 | Pettit | |
| 4,812,628 A | 3/1989 | Boston et al. | |
| 4,902,881 A | 2/1990 | Janku | |
| 4,961,142 A | 10/1990 | Elliott et al. | |
| 4,972,318 A | 11/1990 | Brown et al. | |
| 5,021,967 A | 6/1991 | Smith | |
| 5,053,607 A | 10/1991 | Carlson et al. | |
| 5,119,293 A | 6/1992 | Hammond | |
| 5,175,682 A | 12/1992 | Higashiyama et al. | |
| 5,220,501 A | 6/1993 | Lawlor et al. | |
| 5,283,829 A | 2/1994 | Anderson | |
| 5,350,906 A | 9/1994 | Brody et al. | |
| 5,367,452 A | 11/1994 | Gallery et al. | |
| 5,408,077 A | 4/1995 | Campo et al. | |
| 5,426,594 A | 6/1995 | Wright et al. | |
| 5,442,567 A | 8/1995 | Small | |
| 5,448,043 A | 9/1995 | Nakano et al. | |
| 5,461,217 A | 10/1995 | Claus | |
| 5,464,971 A | 11/1995 | Sutcliffe et al. | |
| 5,465,206 A | 11/1995 | Hilt et al. | |
| 5,477,037 A | 12/1995 | Berger | |
| 5,477,038 A | 12/1995 | Levine et al. | |
| 5,484,988 A | 1/1996 | Hills et al. | |
| 5,491,325 A | 2/1996 | Huang et al. | |
| 5,504,677 A | 4/1996 | Pollin | |
| 5,510,979 A | 4/1996 | Moderi et al. | |
| 5,513,117 A * | 4/1996 | Small | 700/233 |
| 5,524,073 A | 6/1996 | Stambler | |
| 5,555,496 A | 9/1996 | Tackbary et al. | |
| 5,570,465 A | 10/1996 | Tsakanikas | |
| 5,577,109 A | 11/1996 | Stimson et al. | |
| 5,604,802 A | 2/1997 | Holloway | |
| 5,622,388 A | 4/1997 | Alcordo | |
| 5,629,982 A | 5/1997 | Micali | |
| 5,638,283 A | 6/1997 | Herbert | |
| 5,649,117 A | 7/1997 | Landry | |
| 5,650,604 A | 7/1997 | Marcous et al. | |
| 5,657,201 A | 8/1997 | Kochis | |
| 5,677,955 A | 10/1997 | Doggett et al. | |
| 5,679,940 A | 10/1997 | Templeton et al. | |
| 5,699,528 A | 12/1997 | Hogan | |
| 5,717,868 A | 2/1998 | James | |
| 5,721,768 A | 2/1998 | Stimson et al. | |
| 5,732,136 A | 3/1998 | Murphree et al. | |
| 5,732,400 A | 3/1998 | Mandler et al. | |
| 5,745,886 A | 4/1998 | Rosen | |
| 5,757,917 A | 5/1998 | Rose et al. | |
| 5,764,888 A | 6/1998 | Bolan et al. | |
| 5,774,879 A | 6/1998 | Custy et al. | |
| 5,778,067 A | 7/1998 | Jones et al. | |
| 5,779,379 A | 7/1998 | Mason et al. | |
| 5,783,808 A | 7/1998 | Josephson | |
| 5,787,403 A | 7/1998 | Randle | |
| 5,790,793 A | 8/1998 | Higley | |
| 5,794,207 A | 8/1998 | Walker et al. | |
| 5,815,657 A | 9/1998 | Williams et al. | |
| 5,825,617 A | 10/1998 | Kochis et al. | |
| 5,826,241 A | 10/1998 | Stein et al. | |
| 5,828,875 A | 10/1998 | Halvarsson et al. | |
| 5,832,463 A | 11/1998 | Funk | |
| 5,870,718 A | 2/1999 | Spector | |
| 5,875,435 A | 2/1999 | Brown | |
| 5,878,211 A | 3/1999 | Delagrange et al. | |
| 5,880,446 A | 3/1999 | Mori et al. | |
| 5,893,080 A | 4/1999 | McGurl et al. | |
| 5,896,298 A | 4/1999 | Richter | |
| 5,897,625 A | 4/1999 | Gustin et al. | |
| 5,897,989 A | 4/1999 | Beecham | |
| 5,898,154 A | 4/1999 | Rosen | |
| 5,899,980 A | 5/1999 | Wilf et al. | |
| 5,899,982 A | 5/1999 | Randle | |
| 5,902,983 A | 5/1999 | Crevelt et al. | |
| 5,903,881 A | 5/1999 | Schrader et al. | |
| 5,909,492 A | 6/1999 | Payne et al. | |
| 5,909,673 A | 6/1999 | Gregory | |
| 5,910,988 A | 6/1999 | Ballard | |
| 5,913,202 A | 6/1999 | Motoyama | |
| 5,915,023 A | 6/1999 | Bernstein | |
| 5,920,629 A | 7/1999 | Rosen | |
| 5,920,847 A | 7/1999 | Kolling et al. | |
| 5,920,848 A | 7/1999 | Schutzer et al. | |
| 5,937,396 A | 8/1999 | Konya | |
| 5,949,044 A | 9/1999 | Walker et al. | |
| 5,952,639 A | 9/1999 | Ohki et al. | |
| 5,953,709 A | 9/1999 | Gilbert et al. | |
| 5,953,710 A | 9/1999 | Fleming | |
| 5,960,412 A | 9/1999 | Tackbary et al. | |
| 5,963,647 A | 10/1999 | Downing et al. | |
| 5,974,146 A | 10/1999 | Randle et al. | |
| 5,974,194 A | 10/1999 | Hirani et al. | |
| RE36,365 E | 11/1999 | Levine et al. | |
| 5,987,426 A | 11/1999 | Goodwin, III | |
| 5,993,047 A | 11/1999 | Novogrod et al. | |
| 5,999,624 A | 12/1999 | Hopkins | |
| 6,003,763 A | 12/1999 | Gallagher et al. | |
| 6,011,833 A | 1/2000 | West | |
| 6,012,048 A | 1/2000 | Gustin et al. | |
| 6,015,087 A | 1/2000 | Seifert et al. | |
| 6,027,216 A | 2/2000 | Guyton | |
| 6,029,150 A | 2/2000 | Kravitz | |
| 6,030,000 A | 2/2000 | Diamond | |
| 6,032,133 A | 2/2000 | Hilt et al. | |
| 6,032,137 A | 2/2000 | Ballard | |
| 6,035,285 A | 3/2000 | Schlect et al. | |
| 6,035,406 A | 3/2000 | Moussa et al. | |
| 6,039,245 A | 3/2000 | Symonds et al. | |
| 6,039,250 A | 3/2000 | Ito et al. | |
| 6,044,360 A | 3/2000 | Picciallo | |
| 6,044,362 A | 3/2000 | Neely | |
| 6,045,039 A | 4/2000 | Stinson et al. | |
| 6,058,417 A | 5/2000 | Hess et al. | |
| 6,064,990 A | 5/2000 | Goldsmith | |
| 6,070,150 A | 5/2000 | Remington et al. | |
| 6,070,156 A | 5/2000 | Hartsell et al. | |
| 6,070,798 A | 6/2000 | Nethery | |
| 6,078,907 A | 6/2000 | Lamm | |
| 6,081,790 A | 6/2000 | Rosen | |
| 6,088,683 A | 7/2000 | Jalili | |
| 6,088,684 A | 7/2000 | Custy et al. | |
| 6,097,834 A | 8/2000 | Krouse et al. | |
| 6,098,053 A | 8/2000 | Slater | |
| 6,106,020 A | 8/2000 | Leef et al. | |
| 6,119,106 A | 9/2000 | Mersky et al. | |
| 6,119,931 A | 9/2000 | Novogrod | |
| 6,122,625 A | 9/2000 | Rosen | |
| 6,128,603 A | 10/2000 | Dent et al. | |
| 6,134,561 A | 10/2000 | Brandien et al. | |
| 6,145,738 A | 11/2000 | Stinson et al. | |
| 6,148,377 A | 11/2000 | Carter et al. | |
| 6,149,056 A | 11/2000 | Stinson et al. | |
| 6,164,528 A | 12/2000 | Hills et al. | |
| 6,167,386 A | 12/2000 | Brown | |
| 6,175,823 B1 | 1/2001 | Van Dusen | |
| 6,189,787 B1 | 2/2001 | Dorf | |
| 6,193,152 B1 | 2/2001 | Fernando et al. | |
| 6,193,155 B1 | 2/2001 | Walker et al. | |
| 6,199,761 B1 | 3/2001 | Drexler | |
| 6,202,054 B1 | 3/2001 | Lawlor et al. | |
| 6,206,283 B1 | 3/2001 | Bansal et al. | |
| RE37,122 E | 4/2001 | Levine et al. | |
| 6,223,168 B1 | 4/2001 | McGurl et al. | |
| 6,246,996 B1 | 6/2001 | Stein et al. | |

| | | |
|---|---|---|
| 6,247,047 B1 | 6/2001 | Wolff |
| 6,260,024 B1 | 7/2001 | Shkedy |
| 6,263,446 B1 | 7/2001 | Kausik et al. |
| 6,269,369 B1 | 7/2001 | Robertson |
| 6,275,829 B1 | 8/2001 | Angiulo et al. |
| 6,286,756 B1 | 9/2001 | Stinson et al. |
| 6,289,322 B1 | 9/2001 | Kitchen et al. |
| 6,292,789 B1 | 9/2001 | Schutzer |
| 6,305,604 B1 | 10/2001 | Ono |
| 6,308,887 B1 | 10/2001 | Korman et al. |
| 6,314,169 B1 | 11/2001 | Schelberg, Jr. et al. |
| 6,317,745 B1 | 11/2001 | Thomas et al. |
| 6,321,211 B1 | 11/2001 | Dodd |
| 6,321,984 B1 | 11/2001 | McCall et al. |
| 6,321,987 B1 | 11/2001 | Watanabe et al. |
| 6,327,570 B1 | 12/2001 | Stevens |
| 6,327,575 B1 | 12/2001 | Katz |
| 6,343,279 B1 | 1/2002 | Bissonette et al. |
| 6,347,305 B1 | 2/2002 | Watkins |
| 6,360,254 B1 * | 3/2002 | Linden et al. ............... 709/219 |
| 6,367,693 B1 | 4/2002 | Novogrod |
| 6,370,514 B1 | 4/2002 | Messner |
| 6,394,343 B1 | 5/2002 | Berg et al. |
| 6,408,284 B1 | 6/2002 | Hilt et al. |
| 6,411,942 B1 | 6/2002 | Fujimoto |
| 6,415,271 B1 | 7/2002 | Turk et al. |
| 6,438,586 B1 | 8/2002 | Hass |
| 6,449,599 B1 | 9/2002 | Payne et al. |
| 6,453,300 B2 | 9/2002 | Simpson |
| 6,473,500 B1 | 10/2002 | Risafi et al. |
| 6,484,936 B1 | 11/2002 | Nicoll et al. |
| 6,488,203 B1 | 12/2002 | Stoutenburg et al. |
| 6,502,747 B1 | 1/2003 | Stoutenburg et al. |
| 6,510,453 B1 | 1/2003 | Apfel et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,609,113 B1 | 8/2003 | O'Leary et al. |
| RE38,255 E | 9/2003 | Levine et al. |
| 6,618,705 B1 | 9/2003 | Wang et al. |
| 6,632,250 B1 * | 10/2003 | Lynch et al. ............... 715/210 |
| 6,736,314 B2 | 5/2004 | Cooper et al. |
| 6,761,309 B2 | 7/2004 | Stoutenburg et al. |
| 6,814,282 B2 | 11/2004 | Seifert et al. |
| 6,827,260 B2 | 12/2004 | Stoutenburg et al. |
| 6,829,588 B1 | 12/2004 | Stoutenburg et al. |
| 6,847,947 B1 | 1/2005 | Kambour et al. |
| 6,886,742 B2 | 5/2005 | Stoutenburg et al. |
| 6,908,031 B2 | 6/2005 | Seifert et al. |
| 6,922,673 B2 | 7/2005 | Karas et al. |
| 6,965,912 B2 | 11/2005 | Friedman et al. |
| 2001/0042785 A1 | 11/2001 | Walker et al. |
| 2001/0051876 A1 | 12/2001 | Seigel et al. |
| 2001/0054003 A1 | 12/2001 | Chien et al. |
| 2002/0019776 A1 | 2/2002 | Simpson |
| 2002/0023055 A1 | 2/2002 | Antognini et al. |
| 2002/0035515 A1 | 3/2002 | Moreno |
| 2002/0046106 A1 | 4/2002 | Ishibashi et al. |
| 2002/0062285 A1 | 5/2002 | Amann |
| 2002/0087427 A1 | 7/2002 | Ganesan et al. |
| 2002/0087462 A1 | 7/2002 | Stoutenburg et al. |
| 2002/0087463 A1 | 7/2002 | Fitzgerald et al. |
| 2002/0087467 A1 | 7/2002 | Muscavage et al. |
| 2002/0103711 A1 | 8/2002 | Karas et al. |
| 2002/0104026 A1 | 8/2002 | Barra et al. |
| 2002/0111908 A1 | 8/2002 | Milberger et al. |
| 2002/0138363 A1 | 9/2002 | Karas et al. |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0161702 A1 | 10/2002 | Milberger et al. |
| 2002/0178089 A1 * | 11/2002 | Bezos et al. ............... 705/26 |
| 2003/0024979 A1 | 2/2003 | Hansen et al. |
| 2003/0028491 A1 | 2/2003 | Cooper |
| 2003/0055780 A1 | 3/2003 | Hansen et al. |
| 2003/0061566 A1 | 3/2003 | Rubstein et al. |
| 2003/0069856 A1 | 4/2003 | Seifert et al. |
| 2003/0111529 A1 | 6/2003 | Templeton et al. |
| 2003/0120777 A1 | 6/2003 | Thompson et al. |
| 2003/0126036 A1 | 7/2003 | Mascavage et al. |
| 2003/0126075 A1 | 7/2003 | Mascavage et al. |
| 2003/0126083 A1 | 7/2003 | Seifert et al. |
| 2003/0130907 A1 | 7/2003 | Karas et al. |
| 2003/0130940 A1 | 7/2003 | Hansen et al. |
| 2003/0130948 A1 | 7/2003 | Algiene etal. |
| 2003/0135459 A1 | 7/2003 | Abelman et al. |
| 2003/0149662 A1 | 8/2003 | Shore |
| 2003/0154164 A1 | 8/2003 | Mascavage et al. |
| 2003/0167237 A1 | 9/2003 | Degen et al. |
| 2003/0177067 A1 | 9/2003 | Cowell et al. |
| 2003/0187789 A1 | 10/2003 | Karas et al. |
| 2003/0187791 A1 | 10/2003 | Weichert et al. |
| 2003/0187792 A1 | 10/2003 | Hansen et al. |
| 2003/0195811 A1 | 10/2003 | Hayes et al. |
| 2003/0208445 A1 | 11/2003 | Compiano |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2004/0015438 A1 | 1/2004 | Compiano |
| 2004/0024701 A1 | 2/2004 | Hansen et al. |
| 2004/0059672 A1 | 3/2004 | Baig et al. |
| 2004/0068437 A1 | 4/2004 | McGee et al. |
| 2004/0078327 A1 | 4/2004 | Frazier et al. |
| 2004/0088248 A1 | 5/2004 | Cutler |
| 2004/0088261 A1 | 5/2004 | Moore et al. |
| 2004/0094948 A1 | 5/2004 | Laurash et al. |
| 2004/0098328 A1 | 5/2004 | Grant et al. |
| 2004/0098335 A1 | 5/2004 | Michelsen |
| 2004/0107165 A1 | 6/2004 | Blair et al. |
| 2004/0138947 A1 | 7/2004 | McGee et al. |
| 2004/0148286 A1 | 7/2004 | Rogers |
| 2004/0205138 A1 | 10/2004 | Friedman et al. |
| 2004/0210476 A1 | 10/2004 | Blair et al. |
| 2004/0211831 A1 | 10/2004 | Stoutenburg et al. |
| 2005/0017067 A1 | 1/2005 | Weinberger |
| 2005/0167481 A1 | 8/2005 | Hansen et al. |

FOREIGN PATENT DOCUMENTS

| | | |
|---|---|---|
| EP | 0 745 961 A2 | 4/1996 |
| EP | 0 949 596 A2 | 10/1999 |
| EP | 1 077 436 A2 | 2/2001 |
| FR | 2728983 A1 | 7/1996 |
| JP | 411242714 A | 9/1999 |
| WO | WO 96/26508 A1 | 8/1996 |
| WO | WO 98/49644 A1 | 11/1998 |
| WO | WO 98/50875 A2 | 11/1998 |
| WO | WO 99/22291 A1 | 5/1999 |
| WO | WO 99/28872 A1 | 6/1999 |
| WO | WO 00/22559 A1 | 4/2000 |
| WO | WO 00/46725 A1 | 8/2000 |
| WO | WO 00/54122 A2 | 9/2000 |
| WO | WO 00/54122 A3 | 9/2000 |
| WO | WO 00/67177 A2 | 11/2000 |
| WO | WO 00/70517 A2 | 11/2000 |
| WO | WO 00/79452 A2 | 12/2000 |
| WO | WO 01/04816 A1 | 1/2001 |
| WO | WO 01/39093 A1 | 5/2001 |
| WO | WO 02/05195 A1 | 1/2002 |
| WO | WO 02-48839 A2 | 6/2002 |

OTHER PUBLICATIONS

"... And a Nine-Second Money Order Dispenser"; 1991, Post-News, vol. 17, No. 1, 1 page.

"About Western Union: Company History"; http://www.payment-solutions.com/history.html, 2 pages.
"American Express in New Ad Drive"; 1990, American Banker, 1 page.
"American Express Introduces Automated Money Order Dispenser"; 1991, Professional Check Casher, 1 page.
"American Express Money Orders, Travelers Cheques Now on Sale"; 1936, Dots and Dashes, 2 pages.
"American Express Unit Introduces State-Of-The-Art Automated Money Order Dispenser"; 1990, Tri-State Food News, 1 page.
"Amex aims expansion strategy at local currency exchanges"; 1990, Crains's Chicago Business, 1 page.
"Amex Money Order Dispenser"; 1990; The Nilson Report, 1 page.
"Amex tests Moneygram"; 1990, Adnews, 1 page.
"Announcing Quick Collect Online"; 2002, Western Union's Professional Collector, 3 pages.
"Annual Report of First Data Corporation"; 1998, 3 pages.
"Annual Report of First Data Corporation"; 1999, 2 pages.
"Annual Report of the President of the Western Union Telegraph Company"; 1873, pp. 8-11.
"Annual Report of the President of the Western Union Telegraph Company "; 1874, pp. 8-11.
"Annual Report of the Western Union Corporation"; 1990, 4 pages.
"Annual Report of the Western Union Telegraph Company"; 1935, 2 pages.
"Annual Report of the Western Union Telegraph Company"; 1940, pp. 9 and 22.
"Annual Report of the Western Union Telegraph Company"; 1947, 2 pages.
"Annual Report of the Western Union Telegraph Company"; 1949, 2 pages.
"Annual Report of the Western Union Telegraph Company"; 1951, 2 pages.
"Annual Report of the Western Union Telegraph Company"; 1953, 2 pages.
"Annual Report of the Western Union Telegraph Company"; 1954, 3 pages.
"Annual Report of the Western Union Telegraph Company"; 1973, 5 pages.
"Annual Report of the Western Union Telegraph Company"; 1974, 2 pages.
"Annual Report of the Western Union Telegraph Company"; 1978, 2 pages.
"Annual Report of the Western Union Telegraph Company"; 1981, 2 pages.
"AT&T Wireless to Offer Western Union SwiftPay as Replenishment Option for AT&T Free2Go Wireless Prepaid Customers"; 2001, PR Newswire Association, 2 pages.
"Behind the Scenes of Life"; 1996, First Data Corporation Annual Report, 3 pages.
"billserv.com Launches bills.com, an internet Portal for Consumers to Pay All Bills Online at No Cost"; 2000, Business Wire, 2 pages.
"CES/NaBanco Introduces Stored Value Card Technology: Blockbuster Video is First Merchant Partner"; 1996, First Data Corporation News Release, 3 pages.
"Collect your delinquent accounts by Telegraph"; 1933, Form 1229-A, 1 page.
"Collection by Money Transfer: MoneyGram Service Removes Time-Consuming Steps to Commercial Collections"; 1990, Collector, p. 36.
"Common Values: Uncommon Opportunities"; 1995, First Data Corporation Annual Report, 2 pages.
"Dots and Dashes"; 1935, vol. 11, No. 9, 4 pages.
"FDR to Offer HNC Software's Real-Time Fraud Detection: New distribution Agreement to Benefit Card Banks"; 1996, First Data Resources News Release, 3 pages.
"Federal Benefits Checks are Going Away-Don't Let Your Customers Go with Them: Announcing the Western Union Benefits Quick Cash Program"; 4 pages.
"First Data Aligns with CyberCash to Offer New Electronic Coin Service"; 1996, First Data Corporation New Release, 3 pages.

"First Data and Netscape Announce Program to Help Businesses Establish Payment-Enabled Web Sites"; 1996, First Data Corporation New Release, 5 pages.
First Data and Netscape Offering Internet Payment Processing Service; 1996, First Data Corporation News Release, 3 pages.
"First Data InfoSource Offers Database Analysis with DecisionScope"; 1996, First Data Corporation News Release, 2 pages.
"First Data to Offer Card Profitability Software from HNC: Distribution Agreement Poised to Repeat Falcon Success"; 1996, HNC Software, Inc. News Release, 3 pages.
"First Data, First USA Paymentech, GE Capital Invest in First Virtual Holdings"; 1996; First Virtual Holdings Corporation News Release, 3 pages.
"First located example of a money transfer"; Aug. 25, 1873, 1 page.
"Get your Collect Card"; 1939, Dots and Dashes, 2 pages.
"Guess What? The check's not in the mail"; 2001, Western Union's Professional Collector, 3 pages.
"If you're not getting your payment with Quick Collect, chances are you're not getting it"; 2001, 2 pages.
"Introducing the Western Union Cash Card Program"; 1998, 2 pages.
"It takes a certain person to make a good collector. But it takes a good manager to make a champion"; 2001, Western Union's Professional Collector, 3 pages.
"Last of the Pony Express Riders Tells His Story"; 1932, Dots and Dashes, vol. 8, No. 10, 2 pages.
"Leading Provider of Transaction Card Processing Selects Connect Oneserver Software as a Solution for Advanced Internet Merchant Services: First Data Chooses OneServer as an Application to Deliver the Internet to Banks and Merchants"; 1996, press Release, 4 pages.
"Loved one stranded? Send Cash"; 1991, Akron Beacon Journal, 2 pages.
"Messenger Work Full of Adventure, Excitement"; 1933, Dots and Dashes, vol. 9, No. 11, 2 pages.
"Money-wire giants battle for business: Currency exchanges wooed"; 1991, Chicago Sun Times, 2 pages.
"MoneyZap.com Greeting Card Process Flow"; 2000, 2 pages.
"Nation Receives Time Over Western Union Network"; 1931, Dots and Dashes, vol. 7, No. 5, 2 pages.
"Nationwide Credit Collectors Act Globally"; 2001, Western Union's Professional Collector, 3 pages.
"Netscape Announces Netscape Livepayment to Facilitate Internet Commerce"; 1996, Netscape News Release, 4 pages.
"New Western Union SwiftPay Service Continues Expansion of Consumer-to-Business Payment Options"; 1999, PR Newswire Association, 2 pages.
"NTS Completes Merger with EDS Fleet Services; New First Data Unit Sets Sights on New Markets"; 1996, NTS Press Release, 3 pages.
"Only Western Union"; 2 pages.
"PayPal: The way to send and receive money online"; 4 pages.
"PaySys signs up four Asian distributors"; 1997 Orlando Business Journal, 3 pages.
"Pilgrims Started Thanksgiving Custom"; Dots and Dashes, vol. 4, No. 11, 2 pages.
"Quick Cash and Quick Collect: Western Union's money-movers"; 1990 *Newsbriefs*, vol. 2, No. 1, 3 pages.
"Quick Cash and Quick Collect: Western Union's money-movers"; 1990, Newsbriefs, vol. 2, No. 1, 3 pages.
"Quick Collect Sales Presentation"; 28 pages.
"Quick Pay: The Convenient and reliable way to receive payments from customers worldwide"; http://www.payment-solutions.com/quickpay.html, 3 pages.
"Refund of Money Transfers"; 1913, Journal of the Telegraph, 2 pages.
"Reynolds Arcade was Western Union Birthplace"; 1933, Dots and Dashes, vol. 9, No. 8, 2 pages.
"Rhode Island becomes first state to accept child support payments at Western Union: More than 50 Western Union Convenience Pay Agent Locations Offer New Level of Convenience to Rhode Island Residents Who Pay Child Support—"; 2002, 3 pages.

"Rhode Island becomes first state to accept child support payments at Western Union: Government Payment Leader govOne Solutions Adds Walk-in to Full Suite of Payment Options"; 2002, 3 pages.

"Rhode Island becomes First State to Accept Child Support Payments at Western Union: More that 50 Western Union Convenience Pay Agent Locations Offer New Level of Convenience to Rhode Island Residents Who Pay Child Support"; 2002, Press Release, 3 pages.

"Rhode Island becomes First State to Accept Child Support Payments at Western Union: Government Payment Leader govOne Solutions Adds Walk-in to Full Suite of Payment Options"; 2002, Press Release, 3 pages.

"SBC Communications adds Western Union Locations for Walk-in Customer Bill Payments"; SBC News Release, 2 pages.

"Send your payment using Western Union Quick Collect"; 2 pages.

"Send Your Utility Bill Payment from Here!"; 3 pages.

"Sending Cash in a Flash"; 1990, Travel & Leisure, p. 42.

"Sending Cash in a Flash: There are more ways to do it than you might think"; 1991, 2 pages.

"Signature Services: Helping financial institutions send funds faster"; http://www.payment-solutions.com/signature.html, 1 page.

"Strean, LitleNet, BBN, and KPMG Announce Industry-Wide Initiative to Enable Wide-Scale Software Electronic Commerce"; 1996, News Release, 6 pages.

"The Western Union Telegraph Company: Delivery Department Instructions"; 1926, Commercial Bulletin No. 9-A, 2 pages.

"The Western Union Telegraph Company: Rules for Money Transfer Service"; 1908, pp. 3-25.

"Western Union Telegraph Compahy:Instructions for Receiving Clerks"; 1929, Commercial Bulletin No. 37-A, 2 pages.

"The Yellow Blank is Correct for every social need"; 1930, Western Union Booklet, 2 pages.

"The Yellow Blank: When, Why, How to Use It"; 5 pages.

"There's a lot to be said about the many advantages of the Quick Collect service. And look who's saying it."; 4 pages.

"To send a Quick Collect Payment "; sample form, 1 page.

"VIPS Introduces MCSource to Managed Healthcare Industry"; 1996, VIPS Healthcare Information Systems News Release, 2 pages.

"Western Union Creates Phone Card with BLT Technologies"; 1997, PR Newswire Association, 2 pages.

"Western Union Financial Services, Inc.: Benefits Quick Cash Agreement and Disclosure Statement"; 1998, 2 pages.

"Western Union Financial Services, Inc.: Cash Card Agreement and Disclosure Statement"; 1998, 2 pages.

"Western Union Gift Greetings"; 6 pages.

"Western Union Money Orders More Popular Than Ever": 1942, Dots and Dashes, vol. 18, No. 3, 2 pages.

"Western Union Money Transfer Services, Send Money Online, Money Orders, Send Telegrams"; http://www.westernunion.com/info/osCompareMoneyMessage.asp, 2 pages.

"Western Union Payment Services, Bidpay and Quick Collect, Online Bill Payment, Online Auction Payments"; http://www.westernunion.com/info/osComparePayment.asp, 2 pages.

"Western Union Products and Services: a brief description"; 1960, 22 pages.

"Western Union Quick Collect"; 2 pages.

"Western Union Quick Collect: The most agents, the most locations, the most experienced"; 2000, 2 pages.

"Western Union Quick Collect; 3 Easy Ways to Send a Payment: In Person, Online or by Phone!"; 2 pages.

"Western Union SwiftPay Selected by Sheakley Uniservice to Complete W-2 Reprint Transactions"; 2000, PR Newswire Association, 2 pages.

"Western Union/Money Zap: Send and receive money easily over the internet"; http://www.moneyzap.com/main.asp, 23 pages.

"Western Union: Ford Credit Phone Pay-How does it work?", 2001, 1 page.

"Western Union: Now, using our service is even more rewarding"; 1 page.

"Western Union: Some Quick Facts about Quick Collect"; 1 page.

"Western Union's Would-Be Rival"; 1990, American Banker, 1 page.

"When you're helping a customer make a crucial payment there's no room for guesswork"; 2002, Western Union's Professional Collector, 3 pages.

You're sending more than a payment: Point-of-Sale & Merchandising Support Advertising Materials, 2 pages.

American Greeting Cards Click-Through; 38 pages.

Amerinet, Inc., "Debit-It!—The Best Idea In Payment Systems Since the Credit Card", downloaded from website http://www.debit-it.com/ on Feb. 7, 2000, 8 pages.

Bank Network News, "ATMs Give Wire Transfers a Run for The Money," vol. 16, Iss. 17, 3 pages, Jan. 28, 1998.

Bank Network News, "Banks Turn to Debit to Drive Fund Transfers," vol. 18, No. 20, 5 pages, Mar. 16, 2000.

BidPay: Seller FAQs—Receiving Payments and Using the Money Order Service; 7 pages.

Boneh, Dan: "Beaming Money by Email is Web's Next Killer App"; 1999, PR Newswire, 4 pages.

Business Wire, "*E-Commerce, Email and E-greeting Cards Combine in New Web Site Designed by Interactive Bureau*", Sep. 14, 1999 (abstract), [online] [retrieved on May 1, 2002], retrieved from Proquest Database, 2 pages.

Business Wire, "E-Commerce, Email and E-greeting Cards Combine in New Web Site Designed by Interactive Bureau; Flooz.com Features a Fun Online Gift Currency You Send by Email for Any Occasion", downloaded from website http://www.proquest.umi.com.

Business Wire, "Flashcards.com Launches With Dynamic New Form of Cutting-edge Online Greeting Cards & Invitations", Jul. 24, 2000 (abstract), [online] [retrieved on Aug. 2, 2007], retrieved from Proquest Database, 2 pages.

Candygram payment service, 1 page.

Confinity, Inc., *PayPal.com, How PayPal.com Works*, downloaded from website http://www.paypal.com on Feb. 7, 2000, 7 pages.

Dotbank, *The Way to Send and Receive Money on the Internet*, downloaded from website http://www.dotbank.com, Feb. 7, 2000, 6 pages.

First Data Acquires PaySys International; 2001, Press Release, 2 pages.

Gift: Money Order for something you really want: 1933, 1 page.

Holiday Greeting by Western Union; 1933, 1 page.

How money by phone was paid;; Money Transfer Service: Book of Rules and List of Offices; 1926, Western Union Telegraph Company, 3 pages.

http://news.firstdata.com/media/ReleaseDetail.cfm?ReleaseID=849995>.

http://www.vfi-finance.com/tranz330.htm, Tranz 330 Fast, Low-Cost Transaction Automation At The Point Of Service, VeriFone Finance, Jan. 1999, pp. 1-3, especially pp. 1-2.

Idealab company PayMecom printed date Feb. 16, 2000, 7 pages.

Idealab Company, PayMe.com, downloaded from website http://ssl.idealab.com on Feb. 16, 2000, 7 pages.

Intell-A-Check Corp.: "Intell-A-Check! -The Way to get Paid", Intell-A-Check product overview, retrieved from http://www.icheck.com/ on Feb. 7, 2000, 7 pages.

Karpinski, R. "Web Merchants Try Debit Cards and Gift Certificates to Spur Sales" InternetWeek, Oct. 11, 1999, 2 pages.

Kaufman, Leslie: "Excite@Home To Acquire Bluemountain"; Oct. 26, 1999; The New York Times, 3 pages.

Kolor, Joanna, "A New Era of ATMs Breeds Much More than Cash," Bank Technology News, vol. 9, No. 10, 7 pages, Oct. 1996.

Komando, Kim, Popular Mechanics, vol. 176, Iss. 1, p. 38, Jan. 1999.

Latour, Almar; "PayPal Electronic Plan May be on the Money in Years to Come"; 1999, The Wall Street Journal, 2 pages.

Lawton, George; "Biometrics: A New Era in Security"; 1998, Computer, vol. 31, No. 8, pp. 16-18.

Levin, Gary; "Western Union not fading into sunset; new services are added as telegrams drop"; 1992, 2 pages.

List of Prepaid Services, http://www.westernunion.com/info/osComparePrePaid.asp, 1 page.

Luxury Brands LLC: WOrld Famous Brands at Liquidation Proces; http://www.auctionbytes.com/cab/pages/payment, 3 pages.

Money Order with confirmation; 1948, 1 page.

Money Orders by Phone; 1935, Fortune Magazine, 3 pages.

New commercial services from Western Union allow businesses to directly transfer money internationally; User companies can now send or receive money at their own offices through on-line connection to world's largest international money transfer network. Business Wire. Oct. 16, 1995, p. 1.

PayPal for the Palm; http://handheldnews.com/file.asp?ObjectID=5401, 2 pages.
PaySys—company overview, 2 pages.
Picture of Bill payment form or advertisement, 1 page.
Plotkin, Hal; "Beam Me up Some Cash"; 1999, Silicon Valley Insider, 3 pages.
PR Newswire, "GiftSpot.com Simplifies Gift-Giving on the Internet," Oct. 20, 1999 (abstract), [online] [retrieved on May 1, 2002], retrieved from Proquest Database, 5 pages.
Press Release: "Western Union Announces ATM Card Payout for Money Transfer Transactions"; 2001, URL: http://news.firstdata.com/media/ReleaseDetail.cfm?ReleaseID=849995>.
Products and Services for PaySys, 2 pages.
Quick Cash: A safe and reliable way to send funds around the world; http://www.payment-solutions.com/quickcash.html, 1 page.
Redman, Russell, "Western Union, EDS Plan Cash Transfers Via ATMs," Bank Systems & Technology, vol. 35, Iss. 8, 3 pages, Aug. 1998.
Remittance for order sent via Western Union; 1933, 2 pages.
Russo, R. "Omaha's Giftpoint.com Draws $5 Million Investment", Omaha World, Dec. 14, 1999, 2 pages.
Shopping Order by Western Union, 1933, 1 page.
Shopping Order service and gift service; 1934, Western Union Telegraph Company, Money Order Book, 6 pages.
State of New York Banking Department: Staff Letters and Memoranda; 2000, http://www.banking.state.ny.us/Io000718.htm, 2 pages.
Steiner, Ina: "Accepting Credit Cards When You Sell Items: ProPay and Billpoint Payment Services"; 2000 Auction Bytes, 4 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Steiner, Ina: "PayPal Online Payment Service—Another Way to Pay for Auction Items"; 2000, Auction Bytes, 4 pages.
Stockel, Anna; "Securing Data and Financial Transactions"; 1995, Institute of Electrical and Electronics Engineers 29th Annual Conference, pp. 397-401.
Survey of services; 1960, pp. 2-31.
TeleCheck International, Inc.: "Making Checks Our Responsibility", retrieved from http://www.telecheck.com/home/home.html on Feb. 7, 2000, 8 pages.
Transfers require ID made by telephaph; 1895, Tariff Book, 4 pages.
Transpoint, "The Way to Pay Online", downloaded from website http://www.transpoint.com/ on Feb. 10, 2000, 12 pages.
Troy, Mike, "Cards: E-Greetings Break the Mold, Redefine the Industry," Discount Store News, vol. 38, Iss. 23, 3 pages, Dec. 13, 1999.
VisonPlus Consumer Payment Solution Overview, 2 pages.
Walker, L. "Click a Card", The Washington Post, Dec. 16, 1999, 3 pages.
Website "eCount" at http://www.ecount.com.
Website: "Billpoint" at http://www.billpoint.com.
Website: "eMoneyMail" at http://www.emoneymail.com.
Website: "I-Escrow" at http://www.iescrow.com.
Website: "PayMe.com" at http://www.payme.com.
Website: "PayMyBills.com" at http://www/paymybills.com.
Website: "PayPal" at http://www.paypal.com.
Website: "Tradesafe.com" at http://www.tradesafe.com.
Wermer, Sandra; "A million credit card transactions in five hours"; 1997, Primeur, 2 pages.
Western Union Credit Card; 1915, 4 pages.
Western Union Domestic Transfer Order, Form 72-A, 1933, 1 page.
Western Union Foreign Transfer Order, Form 72-A, 1933, 1 page.
Western Union Gift Orders: A Practical Answer to the Christmas Gift Problem, 1933, 1 page.
Western Union Gift Orders: The Sensible, Convenient Way to take care of your Christmas Shopping; 1933, 1 page.
Western Union Hotel-Motel Reservation Service, 1 page.
Western Union Money Transfer, Form 72-A, 1933, 1 page.
Western Union New Supplement: Money Orders delivery through Mailgram: 1975, 2 pages.
Western Union News Supplement: Automatic travelers checks using Western Union; 1975, 2 pages.
Western Union Quick Collect; The Fastest way to collect good funds; 1999, 11 pages.
Western Union Shopping Order, 1933, 2 pages.
Western Union Telegraph Company; 1933, Money Order Message.
Wijnen, Rene; You've Got Money!; 2000, Bank Technology News, vol. 13, No. 6, 4 pages.
x.com, Do More with Your Money, downloaded from website http://www.x.com., Feb. 7, 2000, 5 pages.

* cited by examiner

ELECTRONIC GIFT LINKING

This application is a continuation of U.S. patent application Ser. No. 10/313,934 filed on Dec. 5, 2002 and entitled "Electronic Gift Linking"; which is a continuation-in-part of U.S. patent application Ser. No. 10/010,068, filed on Dec. 6, 2001 and entitled "Electronic Gift Greeting" which is a continuation-in-part of U.S. patent application Ser. No. 09/737,912 filed on Dec. 15, 2000 and entitled "Online Method and System for Ordering and Having Delivered a Paper Greeting Message and Payment Instrument," and which claims the benefit under 35 U.S.C. § 119(e) of U.S. Provisional Patent Application No. 60/256,127 filed on Dec. 15, 2000 and entitled "Electronic Gift Greeting." The entire disclosure for each of the above listed Applications is hereby incorporated by reference in its entirety for all purposes.

BACKGROUND OF THE INVENTION

This invention relates in general to greeting cards and, more specifically, to electronic greeting cards.

Electronic greeting cards (eCards) are analogous to paper greeting cards, but are available only on computers in electronic form. These eCards are available from web sites such as BlueMountain.com™. An eCard is usually sent by an e-mail message that invites the recipient to execute a program or applet that displays a greeting that could be animated or could include a personalized message. Some eCards are displayed within a browser window and could use Macromedia Flash™ animation With paper greeting cards, the sender may accompany the card with a gift commensurate with the occasion as is customary in some cultures. It is known to also include cash, a check or gift certificate along with the paper greeting card to serve as the gift. Electronic greeting cards provide no mechanism for including a gift with the card.

BRIEF DESCRIPTION OF THE DRAWINGS

The present invention is described in conjunction with the appended figures.

Figure 1:
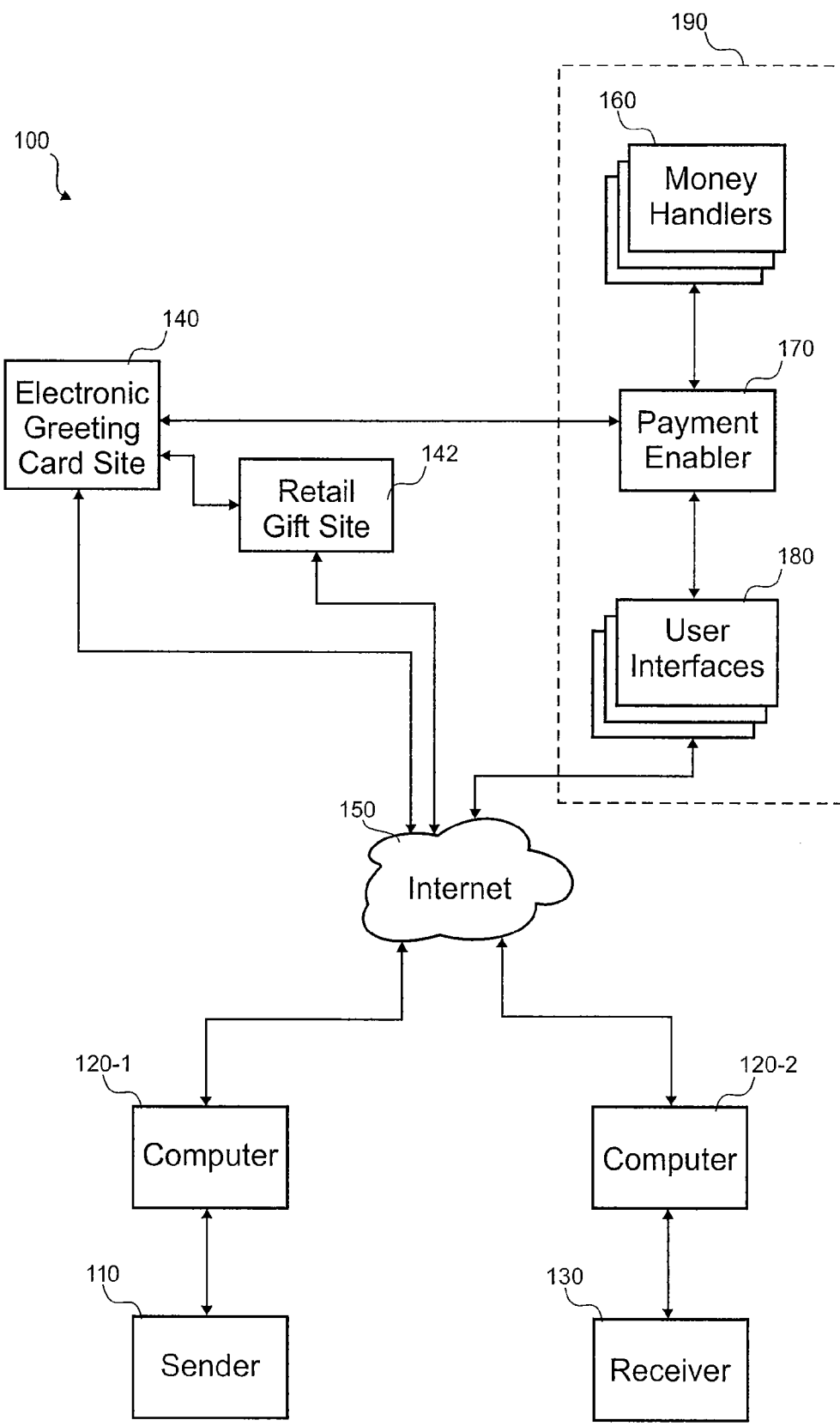
FIG. 1 is a block diagram of an embodiment of an on-line greeting and gift system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention provides an apparatus and method for embedding electronic gifts and gift information in electronic greeting cards (eCards). A sender of the eCard can select the electronic gift during the eCard creation process. The receiver redeems the electronic gift or otherwise receives status after receiving it in the card. Electronic gifts could include any tangible gift, a credit in a stored value fund, a foreign currency credit in the stored value fund, a prepaid credit or debit card, a prepaid phone card, promotional points, airline mileage credits, a gift certificate for one or more retailers, and a separately delivered negotiable instrument. The prepaid credit or debit cards are backed by a credit card company and are usable like a credit card for purchases up to a specified amount.

For example, a $50 MasterCard™ prepaid credit card could be issued that is good for any goods or services offered by a merchant that accepts MasterCard™ until the $50 credit is spent. The tangible gifts are referenced in the eCard and certain status information is available.

In one embodiment, the present invention provides a method for creating an electronic greeting card that references a gift. In one step, a selection of the electronic greeting card is received from a sender of that greeting card. Identification of the gift is received. A code indicative of the gift is created, whereby the code facilitates retrieving information about the gift. The code is embedded in the electronic greeting card.

In another embodiment, the present invention provides a greeting card that references a gift. Included in the greeting card are a greeting portion and a code. The greeting portion could be primarily designed by someone other than a sender. The code provides information for the gift. The gift is separately provided to a receiver of the greeting card. At least some of the information for the gift is unique to that gift.

In yet another embodiment, the present invention provides a computer data signal embodied in a carrier wave. For example, this could be an e-mail message sent by way of the Internet. A first code segment includes code for a greeting portion of an electronic greeting card. A second code segment includes a code that provides information for a gift associated with the electronic greeting card. The gift is separately provided to a receiver of the electronic greeting card.

Referring first to FIG. 1, a block diagram of an embodiment of an on-line greeting and gift system 100 is shown. Included in the system 100 are an eCard site 140, a retail gift site 142, an online money transfer system 190, a sender 110, and a receiver 130. Respective computers 120 interface the sender 110 and receiver 130 to the Internet 150 or other wide area network such that they can interact with the eCard site 140 and the money transfer system 190. Money handlers 160, a payment enabler 170 and user interfaces 180 make up the money transfer system 190.

The eCard site 140 is a web site on the Internet 150 and may include servers and other computers as is well known in the art. The sender 110 points their browser to the eCard site 140 to choose an eCard to send to the receiver 130. Although this embodiment shows the eCard site 140 being separate from the money transfer system 190, other embodiments could combine these into the same location or spread portions among any number of locations.

The retail gift site 142 also includes servers and other computers to implement its functionality. Other embodiments may have any number of retail gift sites 142 that may or may not be affiliated with the system 100. Affiliated gift sites 142 allow automatically providing gift information for an eCard. Non-affiliated gift sites 142 could also used for a gift in an eCard, but the sender may have to manually identify the gift and provide status information. For example, the sender may buy a set of shoes at a bricks-and-mortar retailer. The eCard site 140 could accept the stock keeping unit (SKU) identifier for those shoes to reference description information on the shoes for the eCard. Some embodiments could reference items not even purchased at retail, for example, used merchandise.

The transfer system 190 works in concert with the eCard site 140 to provide certain types of electronic gifts for embedding in the eCard. Also, the receiver 130 may interact with the transfer system 190 to payout the electronic gift. In some cases, the sender 110 chooses a type of electronic gift that does not require the receiver 130 to interact with the transfer system 190, such as with a gift certificate or tangible gift. Money handlers 160 are used to pay-in money used for the electronic gift or payout gifts of money. The user interfaces 180 provide a variety of ways for the sender and receiver 110, 130 to interact with the transfer system 190. Further, the user interfaces 180 could be used to interact with the eCard site 140 and/or gift site 142. Although this embodiment uses a money transfer system 190 for some gifts, other methods could be used to fund these gifts.

Figure 2:
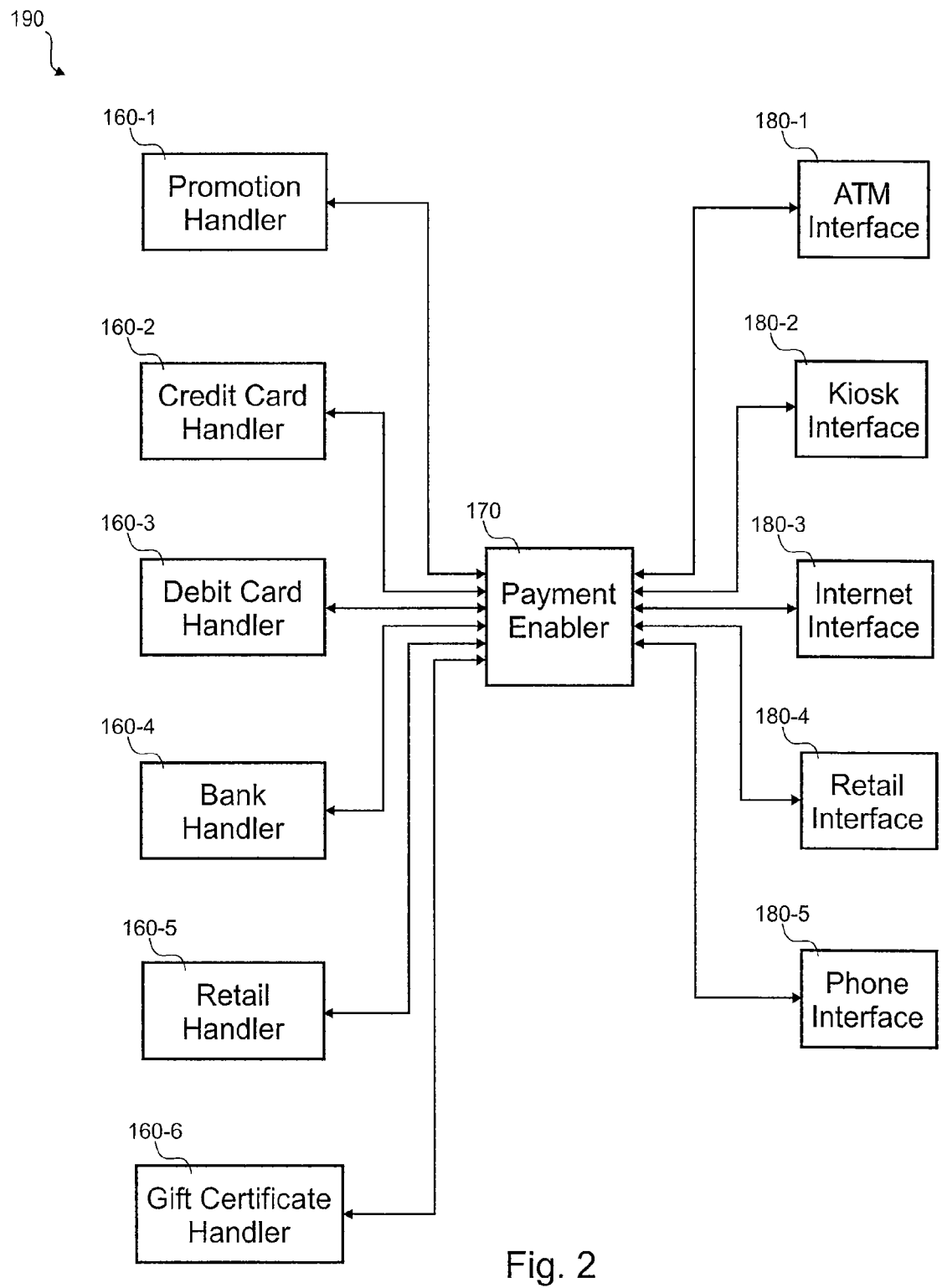
FIG. 2 is a block diagram of an embodiment of an online money transfer system.

With reference to FIG. 2, a block diagram of an embodiment of an online money transfer system 190 is shown. In this embodiment, six handlers 160 and five user interfaces 180 are shown. Other embodiments could have more or less handlers 160 and interfaces 180. Each of the handlers 160 allows a sender or receiver 110, 130 to add and/or remove money from the payment enabler 170. Gifts other than tangible gifts are managed by the money transfer system 190 in this embodiment. Normally, the receiver 130 can choose the handler 160, but in some circumstances, the sender 110 can choose the handler 160. For example, the sender may specify a particular gift certificate handler 160-6 that only allows the certificate to be used at a particular store for merchandise and/or services. The user interfaces 180 allow interaction with the payment enabler 170 to transfer money to and from a stored value fund.

The promotion handler 160-1 allows adding and removing money in a form other than legal tender or a negotiable instrument. Examples include airline mileage programs and prepaid phone cards. For example, a user could use money in their stored value fund to purchase airline miles with an airline mileage handler 160-1. A conversion rate would be applied to convert the money to mileage credit. The promotion handler 160-1 may need special information from the payment enabler 170, such as the sender's 110 promotion account number, etc. Some of the interfaces 180 used to gain access to the payment enabler 170 could be used to also gain access to the eCard site 140 to allow ordering a eCard with an embedded gift where a computer 120 may not be readily available to the sender 110.

The credit and debit card handlers 160-2, 160-3 largely behave the same. Both can be used to add money into the payment enabler 170. In other embodiments, these handlers 160-2, 160-3 can also be used to remove money from the payment enabler 170 also, for example, to purchase a prepaid credit/debit card, to pay down a balance on a credit card, or to add credit to a bank account associated with a debit card. To use these handlers 160-2, 160-3, the payment enabler 170 stores the information for receiving money from credit or debit cards in the conventional way, such as the account number, expiration date, name, and/or PIN. Similar information may be used when paying-out money to a credit/debit card.

The bank handler 160-4 allows electronic funds transfer (EFT) of money to a bank account of the user. The user enters the account number and routing information into the payment enabler 170 with a user interface 180 to facilitate adding and removing of money from the payment enabler with this handler 160-4. In one embodiment, an automated teller machine (ATM) could incorporate the bank handler 160-4 along with an ATM interface 180-1 to allow adding and removing funds along with interfacing with the payment enabler 170. Another embodiment uses a bank handler 160-4 branch location as a retail interface 180-4 for interacting with the payment enabler 170. Some embodiments could wire money into a bank account of the user instead of an EFT.

The retail handler 160-5 typically corresponds to a retail location 600 that may wire money, print money orders and/or cash checks. Money may be sent to the retail handler 160-5, whereafter the user 130 is issued cash or a negotiable instrument for that money. Money can be added to the system 100 by the retail handler 160-5 also. For example, the user 110 may give cash to the agent who enters a credit into the payment enabler. The user could further specify to the agent a receiver who 130 should get the money. A retail interface 180-4 at the retail location 600 is used by the agent to indicate to the payment enabler 170 that the money has been received from or by the user 110, 130. Through a retail handler 160-5, a sender 110 could use the online money transfer system 100 without any knowledge of computers or without any debit/credit card or bank account.

Gift certificates are dispensed through one or more gift certificate handlers 160-6. The gift certificate can be limited to merchandise and/or services from a single store or a group of stores. In some cases, the gift certificate is used only online by entering a code provided to the receiver or could be printed for use in a bricks and mortar store. Cash equivalents such as Flooz™, formerly available from Flooz.com, could also be provided to the receiver 130.

As briefly discussed above, the ATM interface 180-1 allows interaction with the payment enabler 170. The user 110, 130 may or may not have an affiliation with the ATM that is used to interface with the payment enabler 170. Under this circumstance, the owner of the ATM may charge the user a fee for this service. The user 110, 130 can receive cash or deposit cash if the ATM is coupled to a bank handler 160-4. In any event, the ATM interface 180-1 can be used to interface with the payment enabler 170 in the same way a user 110, 130 may interact through a web browser and computer 120 with the payment enabler 170. If the ATM has a magnetic stripe or smart card reader, this could be used by to avoid entering credit or debit card information manually for the payment enabler 170.

A kiosk interface 180-2 allows a user to interact with the payment enabler 170, but typically does not allow adding or removing cash. The kiosk interface 180-2 may be a browser terminal available for general use. Some embodiments may include a check or money order printer for removing money from the system 100. The kiosk interface 180-2 could be in a retail location 600 and linked to the other systems in the retail location 600 such that a payout could be provided by other systems in the retail location 600.

An Internet interface 180-3 is typically implemented through a web browser. The browser downloads web pages from the payment enabler 170. The Internet interface could be hosted by the computer 120 of the user. Some embodiments could host the Internet interface on a portable device such as a wireless phone or personal digital assistant (PDA). The Internet interface 180-3 may also be used by the ATM, kiosk and retail interfaces 180-1, 180-2, 180-4 in whole or in part. The Internet interface 180-3 uses encryption for the link to the payment enabler 170 in some embodiments.

The retail interface 180-4 allows for specialized interaction by an agent at the retail location 600. Agents typically have special training and offer enhanced services over most interfaces 180 and handlers 160. The agent can move money between senders 110 and receivers 130. Also, the agent can pay-in and pay-out money from the transfer system 100. The retail interface 180-4 allows an agent to act on behalf of the user when manipulating the user's account. For security, the user's password or PIN may be entered by the user during this manipulation. Further, the agent may verify the identity of the receiver 130 before disbursing the electronic gift. In one embodiment, a test question is provided by the sender 110 that the receiver 130 must answer before the electronic gift is paid-out.

Interaction with the payment enabler 170 may also be performed over a telephone 140 interfaced to the plain-old telephone system (POTS) 155. The phone interface 180-5 provides voice prompts and recognizes the user's touch-tone or speech recognized input. Enhanced interaction with the phone interface 180-5 could be provided with wireless phones having wireless access protocol (WAP) and/or browser graphical user interfaces (GUIs).

Figure 3:
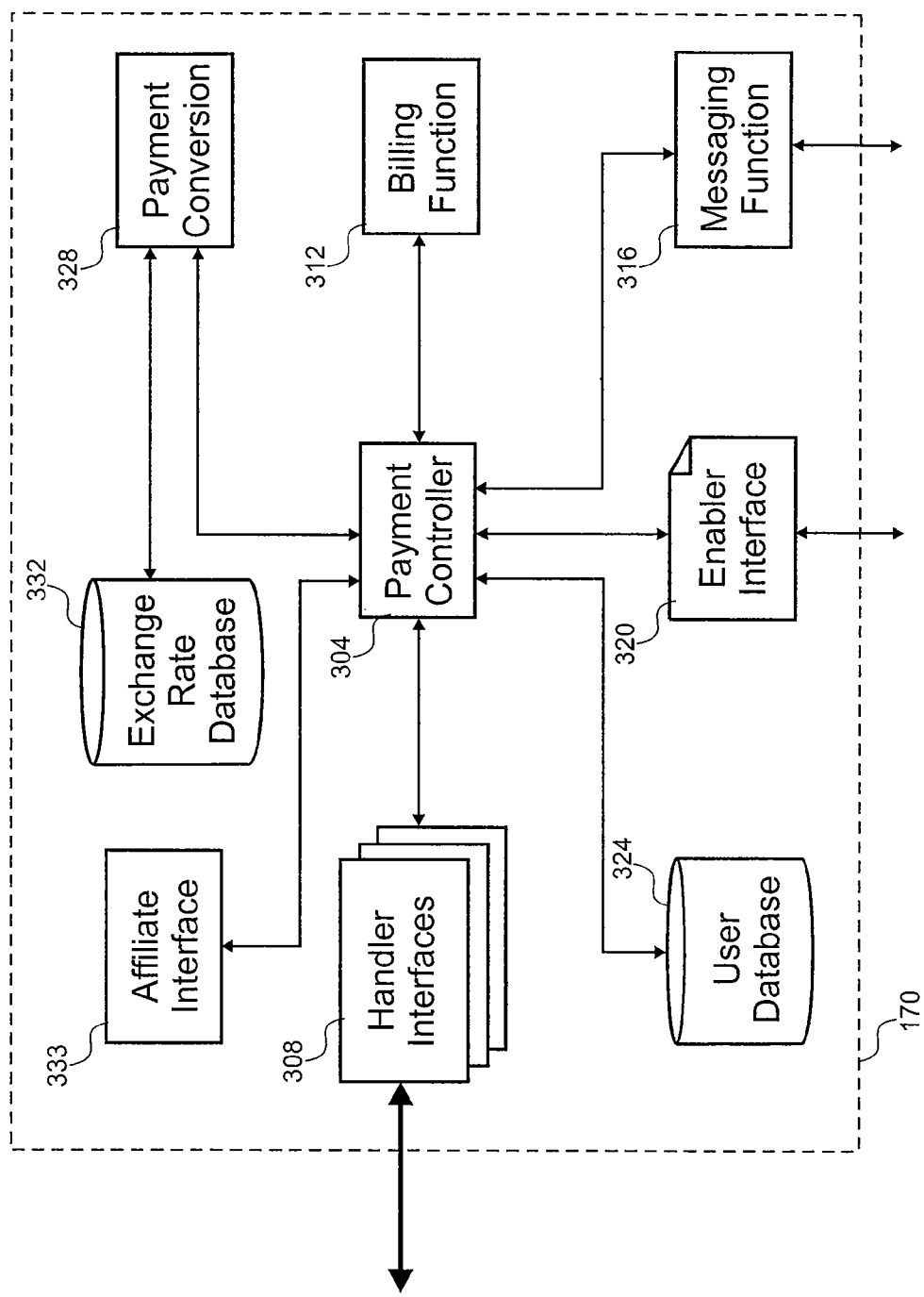
FIG. 3 is a block diagram of an embodiment of a payment enabler.

Referring to FIG. 3, a block diagram of an embodiment of a payment enabler 170 is shown. The transfer of money between handlers 160, stored value funds and users 110, 130 is controlled by the payment enabler 170 in this embodiment. The payment enabler 170 may be implemented on one or more computers in one or more locations where the various computers would communicate over a network. Included in the payment enabler 170 are a payment controller 304, handler interfaces 308, a billing function 312, a messaging function 316, an enabler interface 320, a user database 324, a payment conversion function 328, an affiliate interface 333, and an exchange rate database 332.

The payment controller 304 manages operation of the payment enabler 170. The handlers 160 and interfaces 180 along with user information and money conversion tasks are all choreographed by the payment controller 304. The payment controller 304 is interconnected to the other portions of the payment enabler 170 by one or more networks.

The payment enabler 170 is involved in the process of embedding gifts in eCards. Once a gift is selected in the payment enabler 170, status information is provided to the eCard site 140 by the affiliate interface 333. The payment enabler 170 receives information from the eCard site 140 through the affiliate interface 333 to prepopulate forms. When funds clear or fail to clear, that could also be relayed to the eCard site 140 by this interface 333.

The payment conversion function 328 allows converting between disparate forms of money as it is transferred through the transfer system 190. An exchange rate database 332 holds conversion factors that allow determining the proper weight to give one form of money with respect to the others. In one example, the payment conversion function 328 may convert money in U.S. dollars to money in European Union Euros. In another example, a user may convert money into airline miles of eight miles for every dollar for a promotion handler 160-1. The exchange rate database 332 is updated with conversion rates as often as practical using conventional methods. The conversion rate may accommodate a percentage service fee for the exchange, or instead of a conversion rate, a flat fee could be charged.

A billing function 312 monitors and charges for the services of the payment enabler 170. There may be charges when transferring money, converting money, sending electronic gifts, printing and mailing negotiable instruments, using kiosks, ATMs or retail locations, etc. These charges are normally deducted from a transfer, but other embodiments could charge monthly fees or charge a fee to the sender 110 in addition to the amount transferred. Some embodiments could recover a fee from the handler 160, for example, a fee could be charged to the gift certificate target store instead of charging the sender 110. The different types of handlers 160 may have different fees associated with them. For example, a credit card may have a three percent charge, but a bank transfer may only have a one percent charge. The sender 110 and/or the receiver 130 can be charged to transfer money between themselves. The transfer in or out of the system 100 may incur a separate charge. The billing function 312 may issue invoices for some users 110, 130.

There are handler interfaces 308 to support the various types of handlers 160. Each of these interfaces, 308 may support a single handler 160 or a group of handlers. For example, a single interface may perform EFT both to and from all bank handlers 160. When money is sent to or received from a handler 160, the appropriate handler interface 308 passes the money and transfer information to the payment controller. In some embodiments, the cost of the transfer to or from the handler is reported by the handler interface 308 such that the billing function can recover those costs.

Information for the users of the system 100 is stored in the user database 324. This information includes an address book of other users, money credit in the stored value fund, past money transfer information, account number, e-mail addresses, contact information, handler interface information, handler preference information, etc. The money credit is stored in a trust account for the benefit of the user according to the entry in the user database 324 corresponding to that user and interest may or may not be paid on that money credit.

The enabler interface 320 is used by the various interfaces 180 to interact with the user or their agent. The enabler interface 320 produces the form web pages and informational web pages to allow the user to create and maintain their account, transfer money, select electronic gifts, and learn to use the system 100. The appropriate user interface 180 formats and processes the enabler interface information according to the device used to interface with the payment enabler 170. For example, the Internet interface 180-3 takes the information from the enabler interface 320 and formats into hypertext mark-up language (HTML) appropriate for the computer 120 of the user. Other embodiments may not have a web interface, using application software instead to interact with the enabler interface 320.

A messaging function 316 is used with some configurations to notify the user of certain events. Requests for money are sent by the messaging function 316 along with acknowledgment and billing messages. For example, a transfer not clearing could be sent to the sender 110 such that another payment option could be used to fund the transfer. These messages could be accessed using a web browser, an e-mail program, an instant messaging program, a pager, a WAP enabled device, etc. In some embodiments, the messaging function 316 may issue printed bills for users. The messaging function 316 is also used to communicate with retail locations 600, the eCard site 140 in various embodiments.

Figure 4:
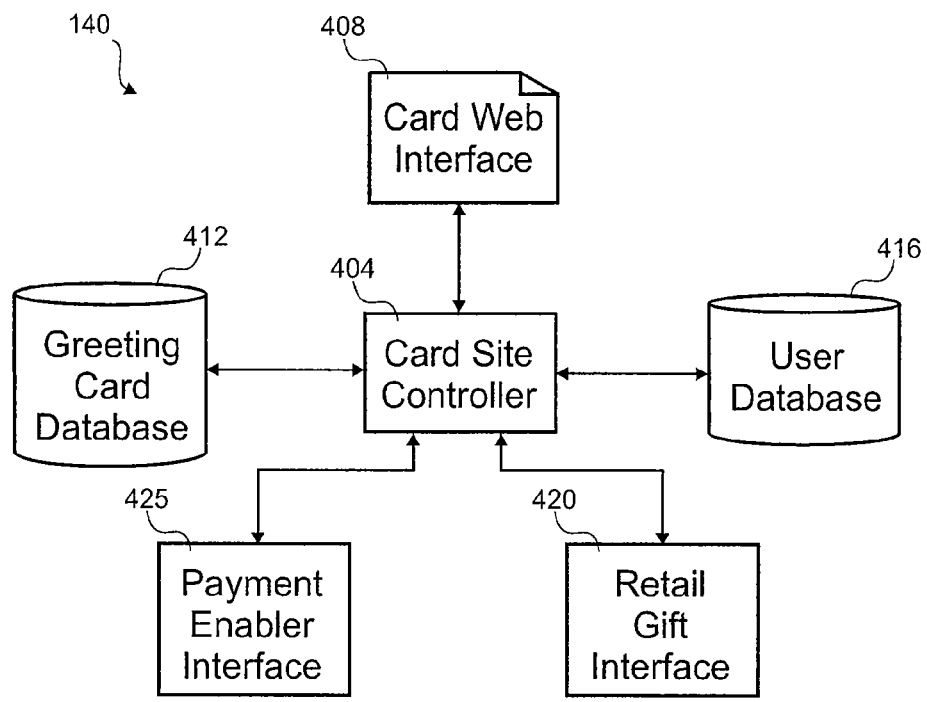
FIG. 4 is a block diagram of an embodiment of an electronic greeting card site.

With reference to FIG. 4, a block diagram of an embodiment of an eCard site 140 is shown. The eCard site 140 works in concert with the money transfer system 190 to allow embedding certain types of electronic gifts for those senders wishing to include a gift with the eCard. The eCard site includes a card site controller 404, a card web interface 408, a user database 416, a greeting card database 412, a payment enabler interface 420, and a retail gift interface 420.

The card site controller 404 manages the functions of the eCard site 140. The card web interface 408 allows interaction with information in the greeting card database 412 and user database 416. Both the sender and receiver 110, 130 interact with the web interface 408 to either send or receive the eCard.

The possible eCards that the sender might select are stored in the greeting card database 412. Templates and possible customizations for each greeting card are also stored in this database. The user database 416 has the customizations for a particular card sent to a particular receiver.

Any account information on the sender and receiver 110, 130 is stored in the user database 416. As mentioned above, the user database 416 also stores the chosen eCard with any customizations for the benefit of the receiver 130. When the receiver provides the e-mailed code to the web interface 408, the eCard is retrieved and displayed in this embodiment. The code is used by the payment enabler to reference the electronic gift chosen by the sender 110. In some embodiments, the code may embed details of the electronic gift or other information.

When the sender or receiver 110, 130 works with an electronic gift, the web interface 408 hands them off to the transfer system 190. The enabler interface 420 facilitates the communication between the eCard site 140 and the transfer system 190 such that the user 110, 130 is provided with a seamless experience. User information is passed by the payment enabler interface 420 to the messaging function 316 of the transfer system 190. Through that same pathway, information on the selected electronic gift is provided to the eCard site 140.

When the sender 110 configures the electronic card to include a tangible gift from the retail gift site 142, the gift site 142 and eCard site 140 interact by way of the retail gift interface 420. After the gift is chosen, status information is also provided to the eCard site by this conduit 420. For example, shipping status, tracking status and return information are provided by the gift site 142 to the eCard site 140 by this interface 420.

Figure 5:
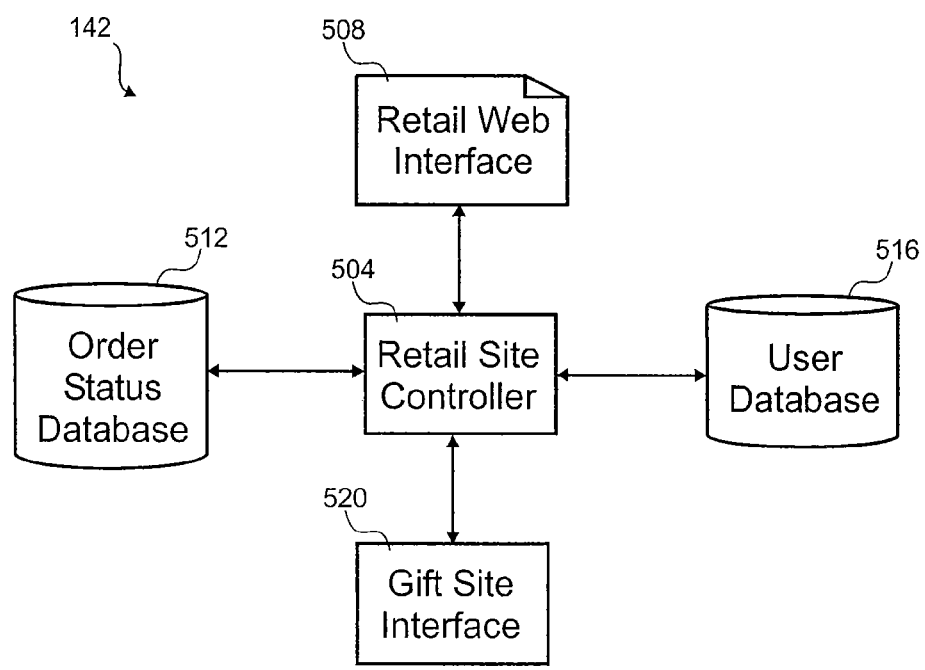
FIG. 5 is a block diagram of an embodiment of a retail gift site.

With reference to FIG. 5, a block diagram of an embodiment of a retail gift site 142 is shown. In this embodiment, the gift site 142 is an affiliated gift site 142 with the ability to provide status information to the eCard site 140. Additionally, the eCard site 140 might provide demographic information on the sender 110 to prepopulate forms on the gift site 142. Other embodiments could work with gift sites which are not affiliated with the eCard site and may not even be online. Included in the gift site 142 are a retail site controller 504, a retail web interface 508, an order status database 512, a user database 516, and a gift site interface 520. There may be additional functions performed by the retail gift site that are not shown in FIG. 5.

The retail site controller 504 manages operation of the eCard site 140. Web or interface pages are formulated by the site controller 504 and presented through the retail web interface 508 to allow creating accounts, buying goods or services, tracking orders, and providing account status. Communication with the gift site(s) is performed by the gift site interface 520 to provide gift status and receive demographic information.

Information is stored in the user database 516 and the order status database 512. The user database 516 has demographic information and payment information on the users of the gift site 142. Some embodiments of the retail site 142 could use the money transfer system 190 as one form of payment. Information on the orders placed by the users of the gift site 142 is maintained in the order status database 512. For example, the order status database 512 knows which items are shipped, which items are accepted by the receiver 130, the shipper tracking for items, the warranty information for each item, and any product information for each item. The product information may include pricing information that is removed in some embodiments before presenting the product information to the receiver 130. Information in both the user database 516 and the order status database 512 can be shared with the eCard site 140 to reduce redundant entry by a user 110, 130. For example, where a user of the retail site 142, but new to the eCard site 140, purchases something to include with an eCard, demographic information could be provided to the eCard site 140 along with information on the gift.

Figure 6:
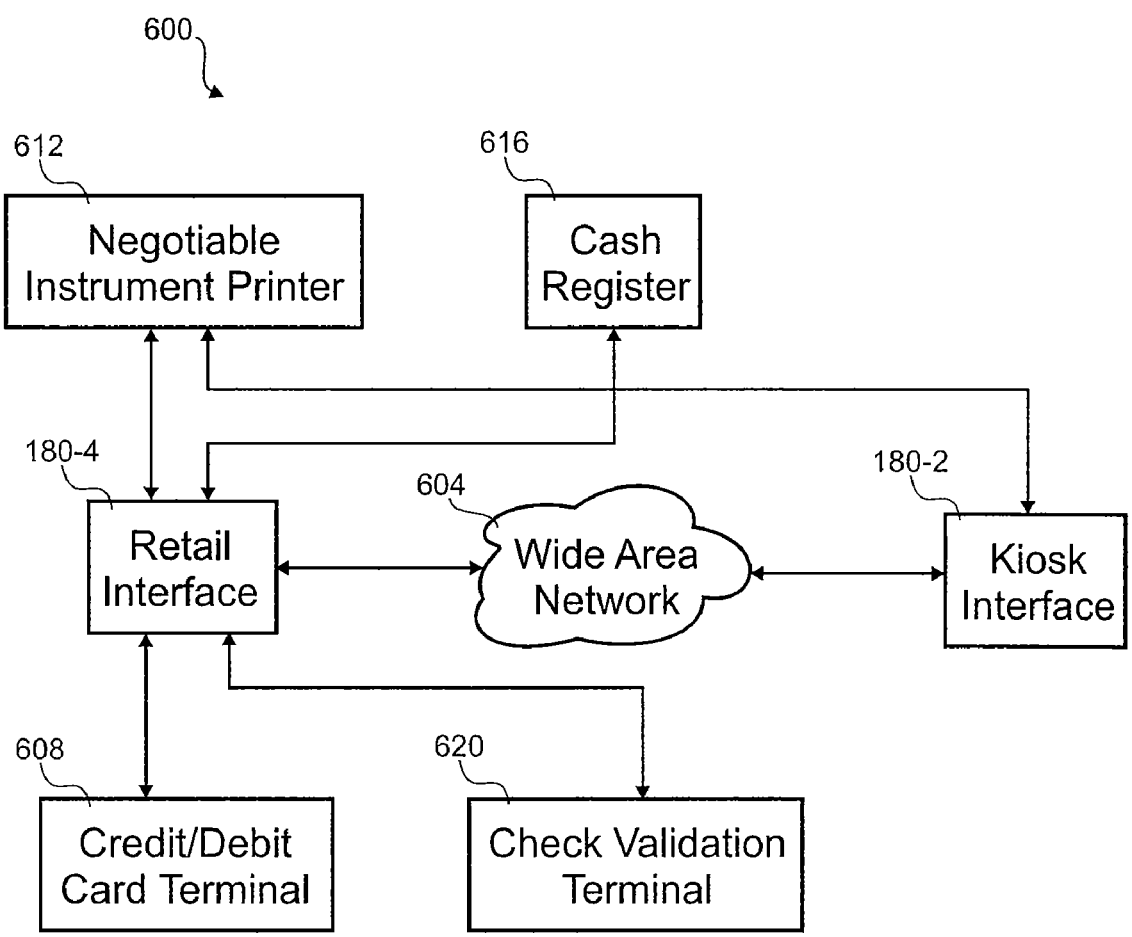
FIG. 6 is a block diagram of an embodiment of a retail location.

Referring to FIG. 6, a block diagram of an embodiment of a retail location 600 is shown. Both the retail and kiosk interfaces 180-2, 180-4 are coupled to a wide area network 604 that is coupled to the payment enabler 170. The retail location 600 may be used as a retail money handler 160-5 to accept and disperse money in the form of check, money order, cash, gift certificate, etc.

The kiosk interface 180-2 is primarily intended for users to interact with, and the retail interface 180-4 is primarily intended for agents to interact with. In some embodiments, both interfaces 180-2, 180-4 are used to perform a transfer and/or gift purchase. For example, the agent may use the retail interface 180-4 to perform the transfer while the kiosk interface 180-2 is used to monitor the agent's actions and enter a password or PIN that is kept secret from the agent. The kiosk interface 180-2 may also be used to perform a complete transfer in circumstances where the user 110, 130 is trained to use the system 100, but does not utilize other interfaces 180 for whatever reason.

The retail interface 180-4 and kiosk interface 180-2 can output a negotiable instrument with a printer 612. Examples of negotiable instruments include money orders, cashiers checks, tellers checks, certified checks, checks, gift certificates, coupons, etc. In some embodiments, each interface 180-2, 180-4 may have a separate printer. The printer 612 may also be used to print receipts and messages related to the transfer of money.

Money can be added to or removed from the system 100 at the retail location 600 with money distribution devices 608, 616, 620. In the conventional manner, cash can be received by the cash register, credit or debit cards and be debited by the card terminal 608, and checks can be confirmed with a check validation terminal 620. Cash can be paid out from the cash register 616 or added to a credit or debit card by the card terminal 608 in a conventional fashion. These money distribution devices 608, 616, 620 all interface with the system 100 by way of the retail interface 180-4 such that pay-outs and pay-ins can be automatically recorded by the payment enabler 170. Where the user may not have convenient access to an interface 180, the interaction with the gift site 142 and eCard site 140 at the retail location 600 are performed using the kiosk and/or retail interfaces 180-2, 180-4.

Figure 7A:
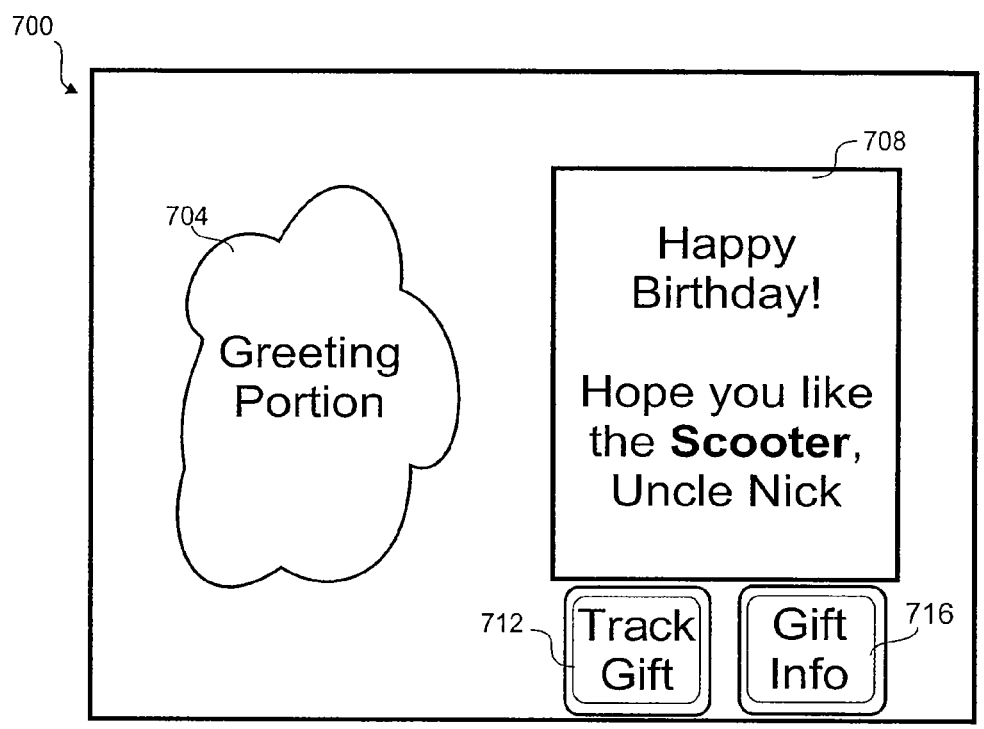
FIG. 7A is a block diagram of an embodiment of an electronic greeting card with an embedded gift.

With reference to FIG. 7A, a block diagram of an embodiment of an eCard 700 with an embedded gift is shown. In this embodiment, Uncle Nick 110 has purchased a scooter for the receiver 130 at the retail gift site 142. The sender chooses a greeting portion 704 of the card 700 that might have a cartoon, animation, picture, moving picture, and/or message.

A personalized portion 708 has a message from the sender 110 with possible hot links to information. For example, the bolded "scooter" can be selected to link to product information on that scooter. The message could have any number of hot links provided by the sender 110. When creating the eCard, certain pre-determined information is made available, such as, product information, retailer information, manufacturer information, product reviews, tracking information, warranty information, content ratings, safety ratings, recall information, frequently asked questions, care instructions, clearing status of a money transfer, expiration of promotional points and coupons, etc. This embodiment also has buttons that activate hot links. A track gift button 712 provides tracking information on the goods and a gift information button 716 provides product information and product reviews for the goods and/or services. The product information is retrieved from the order status database 512 of the gift site 142 or other sources of product information.

Even though some embodiments can provide information on the gift automatically from the retail gift site 142 or money transfer system 190, this information can be manually entered for gifts not from an affiliated gift site 142. More specifically, product information, retailer information, manufacturer information, product reviews, tracking information, warranty information, care instructions, clearing status of a money transfer, expiration of promotional points and coupons, etc. could all be entered by the sender 110 in some way. For example, the sender 110 may buy something at a discount store, but by entering the SKU into the eCard site be able to get access to product information, manufacturer information, product reviews, tracking information, warranty information, care instructions, for that item. The tracking code provided by the shipper of the item could also be manually entered by the sender 110.

Figure 7B:
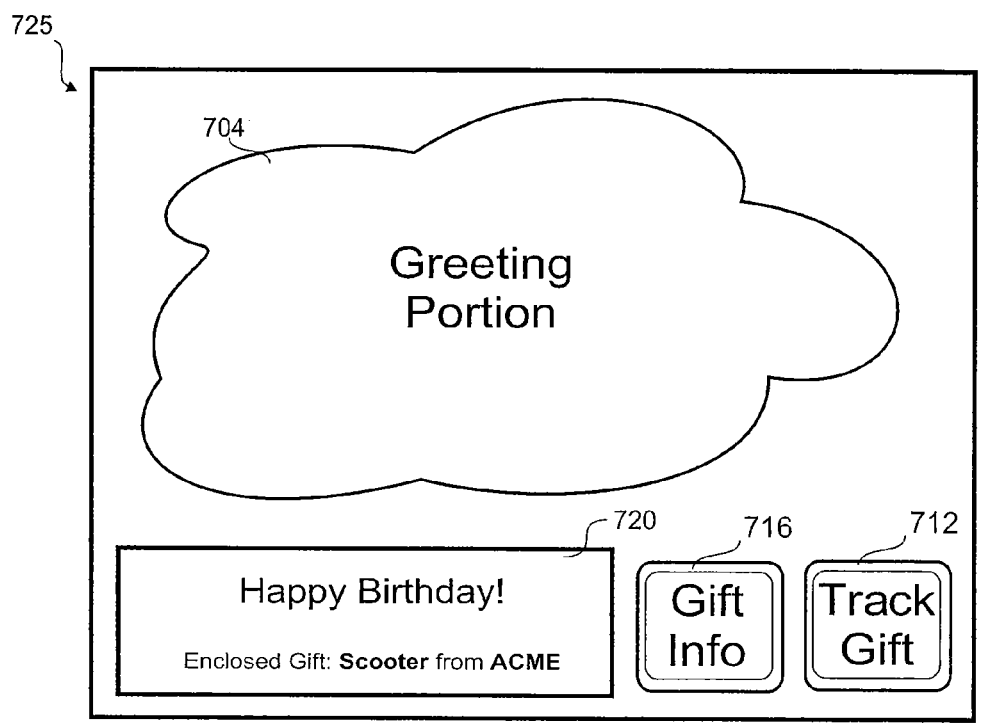
FIG. 7B is a block diagram of another embodiment of the electronic greeting card with the embedded gift.

Referring next to FIG. 7B, a block diagram of another embodiment of the eCard 725 with the embedded gift is shown. This embodiment 725 has a different layout from the embodiment 700 of FIG. 7A. More specifically, a greeting portion 720 lies above the personalized portion 708. Other layouts and configurations are possible for the eCard 725 and the sender 110 can be given the option of which layouts to use. In this embodiment, the personalized message is different. There is a hot link to both the product information of the scooter and the manufacturer information for the scooter.

Figure 7C:
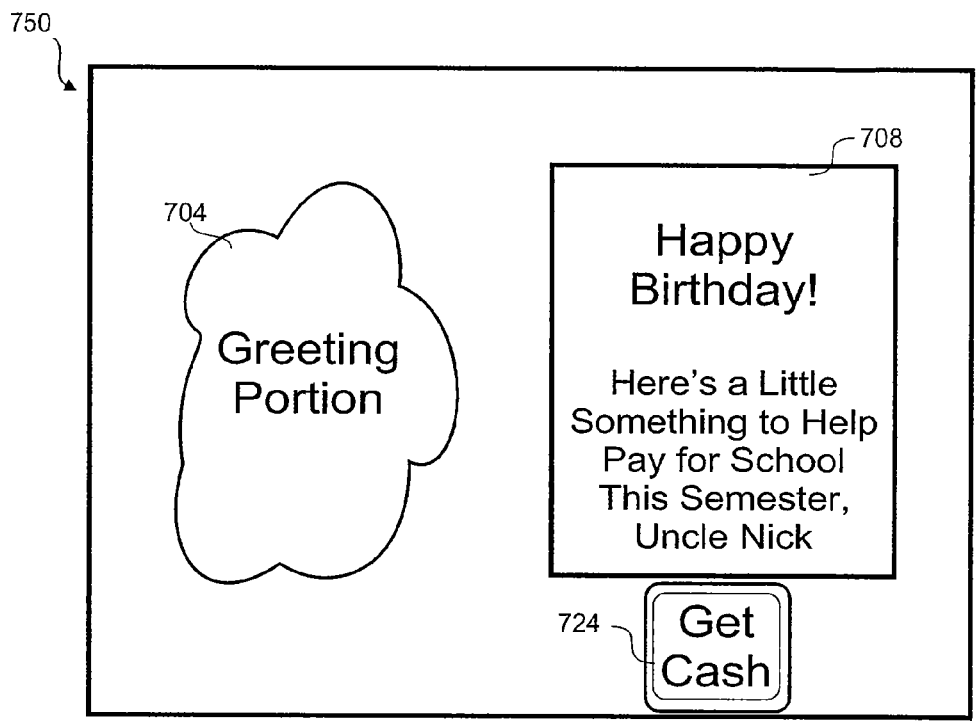
FIG. 7C is a block diagram of yet another embodiment of the electronic greeting card with embedded money.

With reference to FIG. 7C, a block diagram of yet another embodiment of the eCard 750 with embedded money is shown. In this embodiment, the sender 110 has provided money to the receiver 130 redeemable through the money transfer system 190. To redeem the cash, the receiver 130 could choose to receive a gift certificate, promotion points, cash from a retail location 600, transfer out through a money handler 160, or other methods available to the money transfer system 190. By activating the get cash button 724 the receiver 130 links to the enabler interface 320 of the payment enabler 170. Other embodiments could have an external payout where the sender 110 specifies what types of gifts are available, for example, a gift certificate, money at a retail location or a negotiable instrument by mail.

Figure 7D:
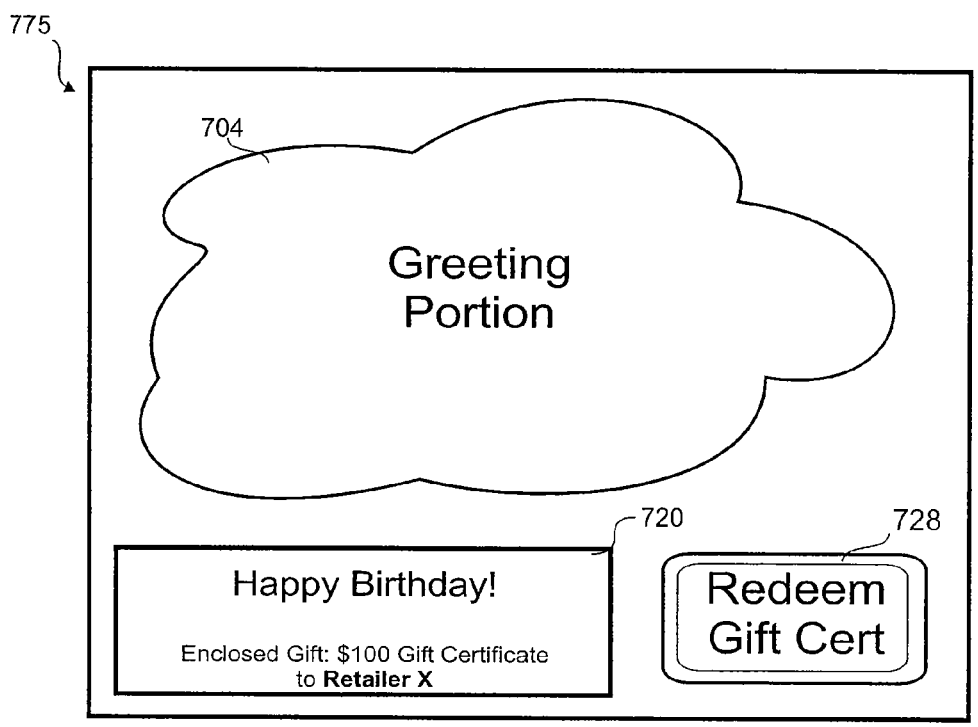
FIG. 7D is a block diagram of still another embodiment of the electronic greeting card with the embedded gift certificate.

Referring next to FIG. 7D, a block diagram of still another embodiment of the eCard 775 with the embedded gift certificate is shown. The greeting portion has a hot link to the gift certificate and to the retailer that will accept the gift certificate. A redeem gift certificate button 728 is also provided that could link to the retailer and associate the gift certificate with the receiver 130. The sender 130 could shop the retailer and apply the gift certificate to their purchases.

Figure 8:
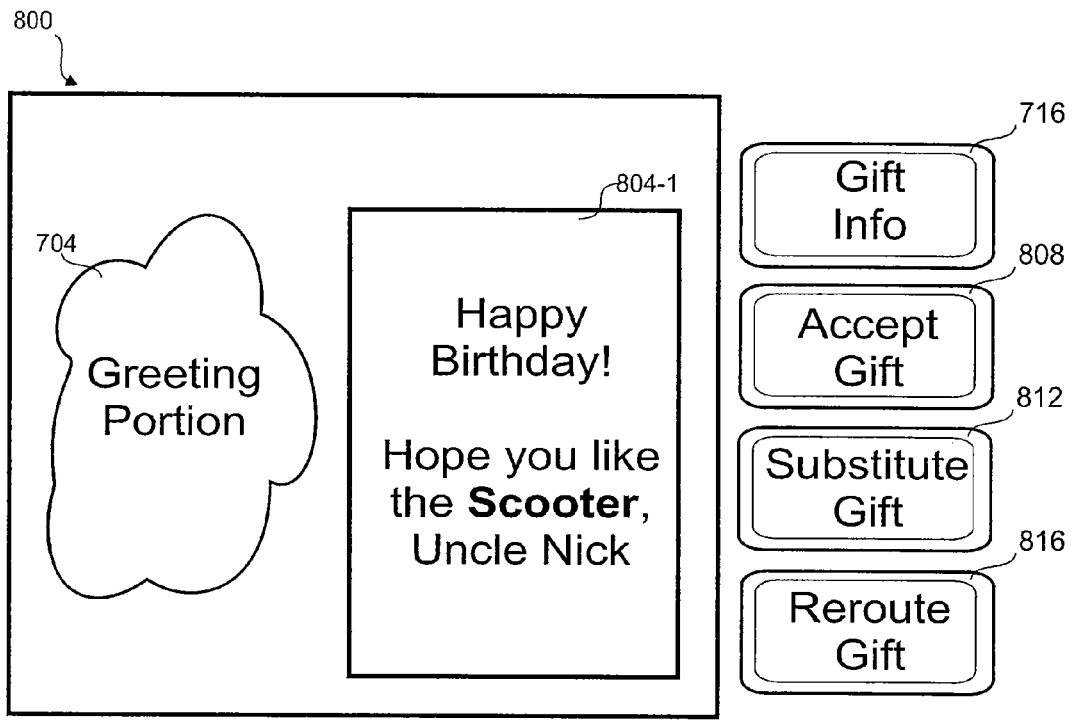
FIG. 8 is a block diagram of an embodiment of an electronic greeting card with an embedded gift having dynamic status that is shown prior to acceptance.

With reference to FIG. 8, a block diagram of an embodiment of an eCard 800 with an embedded gift having dynamic status is shown prior to acceptance. Some embodiments may update a personalized portion 804 and buttons in relation to status of the gift. FIG. 8 through FIG. 11 show various stages of the same eCard as the status changes. In FIG. 8, the eCard has been opened by the receiver 130, but the gift has not been accepted. The gift can be researched with the gift info button 716, whereafter the receiver 130 may or may not accept the gift by selecting the accept gift button 808. The receiver 130 could choose to not ever accept the gift in which case the purchase price could be refunded to the sender. Some embodiments could even include a decline gift button or hot link that would reject the gift. The receiver 130 could be given the option to give that gift or a corresponding credit to charity in some embodiments.

A substitute gift button 812 allows the receiver 130 to receive credit for the gift that could be used for store credit, for credit at another affiliated gift site 142, or for cash in a stored value account of the money transfer system 190. The hot link in the eCard 800 to the scooter of this embodiment could be changed to reflect the substitute gift. The order status database 512 of the retail gift site 142 is updated to reflect any substitute gifts.

An alternate delivery address can be chosen by selecting the reroute gift button 816. Once the address is correct, the receiver can accept the gift. In some embodiments, the sender could be provided status on the substitute gift or addresses.

The sender 110 could specify whether the gift can be rejected, substituted or rerouted by the receiver 130 and the buttons would be displayed accordingly. Further, some retail sites 142 may not allow certain options. For example, a given retail site 142 may not allow rerouting a package. The eCard site 140 could recognize that rerouting is not available and not present the reroute option to the sender 110 or receiver 130.

Figure 9:
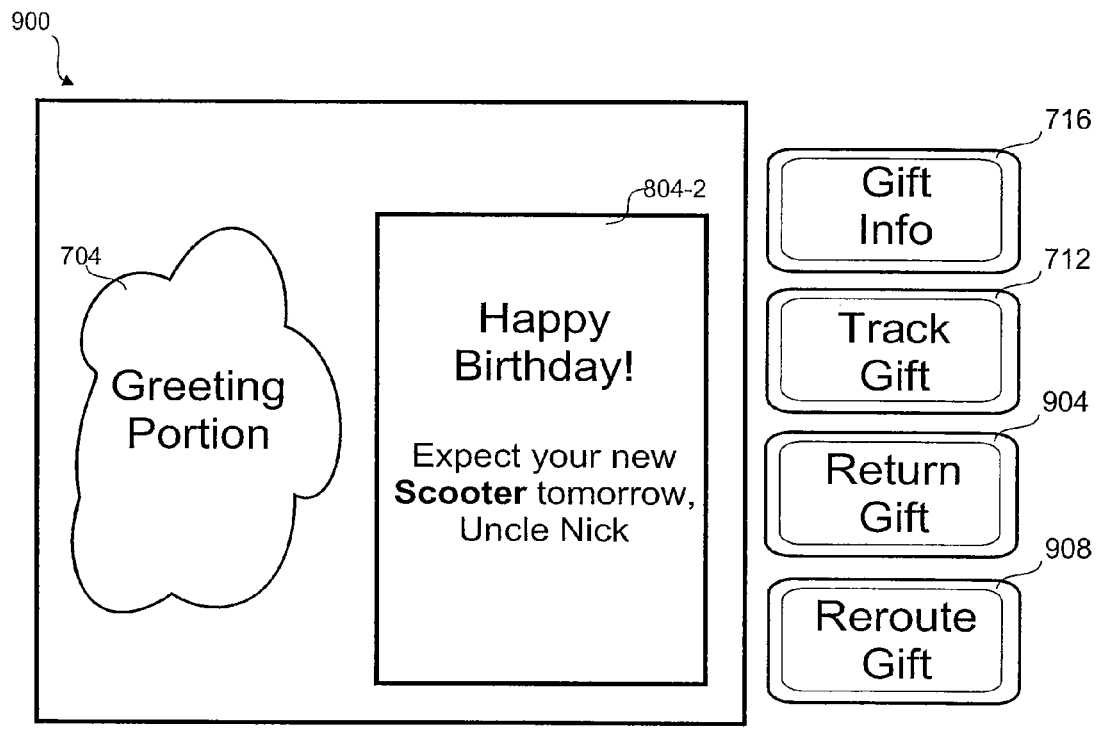
FIG. 9 is a block diagram of another embodiment of the electronic greeting card with the embedded gift having dynamic status that is shown after acceptance.

Referring next to FIG. 9, a block diagram of another embodiment of the eCard 900 with the embedded gift having dynamic status is shown after acceptance by activation of the accept gift button 808 of FIG. 8. The eCard site provides updated tracking information in the form of modifying the personalized portion 804-2 to indicate when the gift should be delivered. The tracking information for the shipper can be retrieved for more detailed information on the shipping status by activation of the track gift button 712. The receiver 130 can choose to return the gift or reject delivery before it is made by selecting the return gift button 904. For the shippers that support rerouting packages in transit, a reroute gift button 908 is provided for that purpose.

Figure 10:
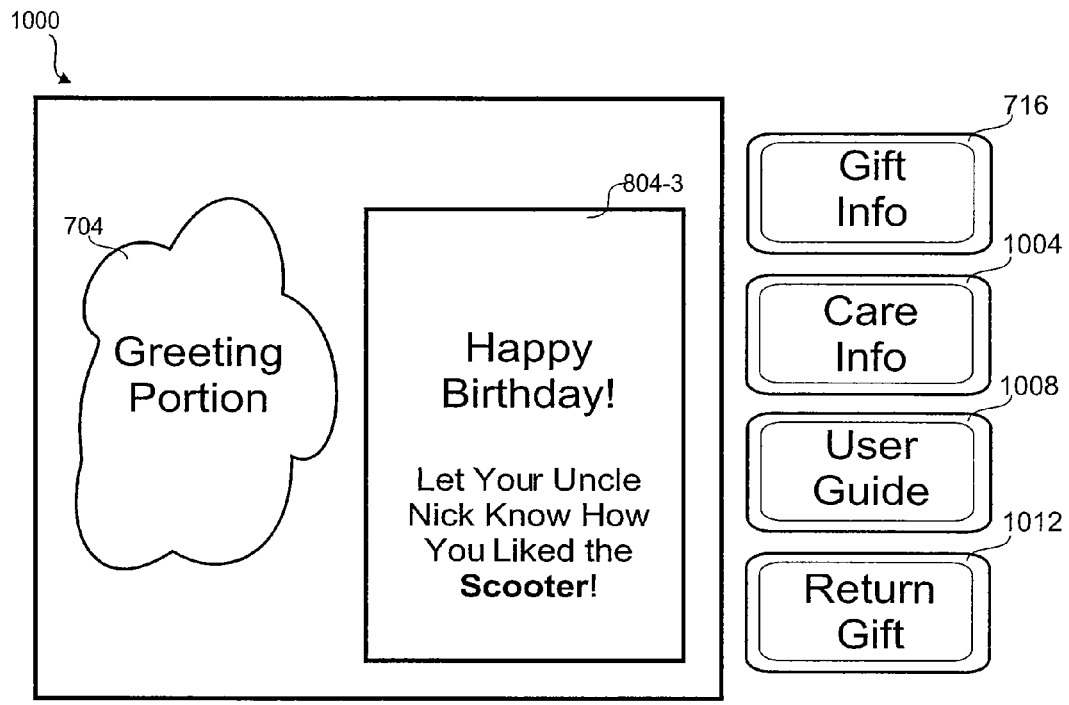
FIG. 10 is a block diagram of yet another embodiment of the electronic greeting card with the embedded gift having dynamic status that is shown after receipt of the gift.

With reference to FIG. 10, a block diagram of yet another embodiment of the eCard 1000 with the embedded gift having dynamic status is shown after receipt of the gift. After the gift is received, the receiver 130 may want to still get product information or could get care information and access to the user guide by respectively selecting a care info button 1004 or a user guide button 1008. The receiver 130 may also want to return the gift by activating a return gift button 1012. The retail gift site 142 would gather the necessary information from the sender after activation of that button. For those gift sites that don't have a return program, the button 1012 would not be available. Some retailers rely upon the original manufacturer for returns. The return button 1012 could link to the manufacturer under those circumstances.

Figure 11:
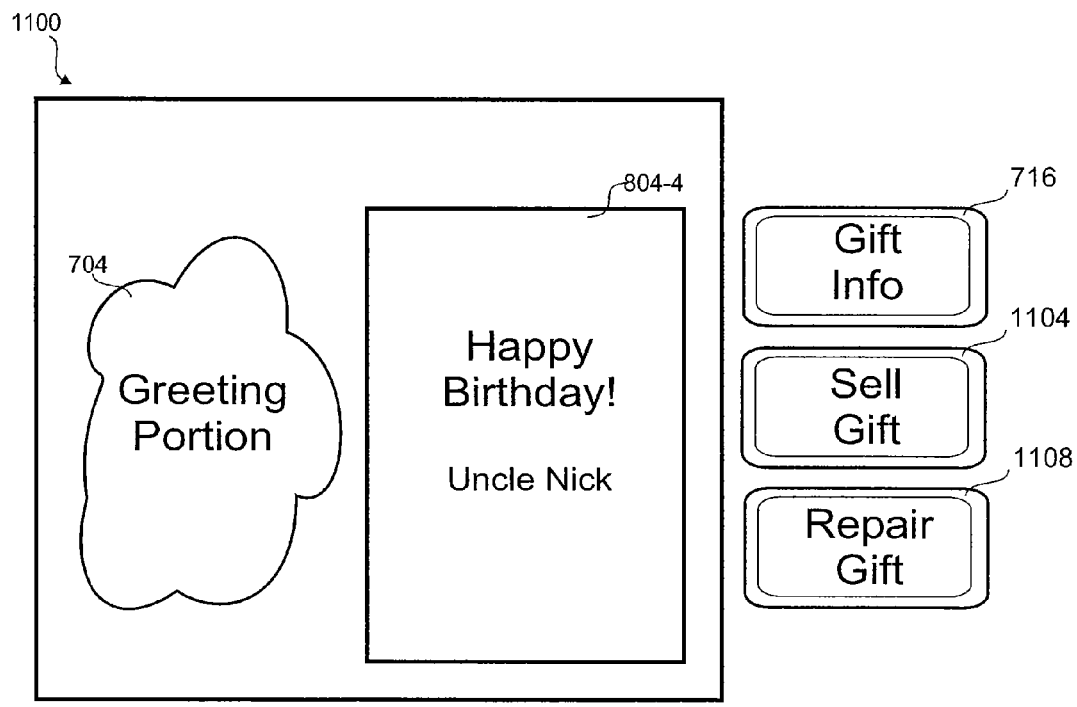
FIG. 11 is a block diagram of an embodiment of the electronic greeting card with the embedded gift having dynamic status that is shown after receipt of the gift and beyond the period to return the gift.

Referring next to FIG. 11, a block diagram of an embodiment of the eCard 1100 with the embedded gift having dynamic status is shown after receipt of the gift and beyond the period to return the gift through the retail gift site 142. Upon revising the eCard, the eCard site 140 recognizes the gift can no longer be returned and reformulates the eCard 1100 for the sender 130. After using the gift for some period of time, the receiver 130 may want more information, to sell the gift or have the gift repaired. A sell gift button 1104 could link to an auction site or classified ad site to assist in selling the item. Information on the gift and sender 130 could be used to prepopulate forms for the selling site. The sender 130 may revisit the eCard to get information on repair of the gift and select a repair gift button 1108. The button could link to a factory repair site if still under warranty, but could also include non-factory repair sites available if the warranty is no longer in force. Forms required by those sites could be prepopulated.

Figure 12A:
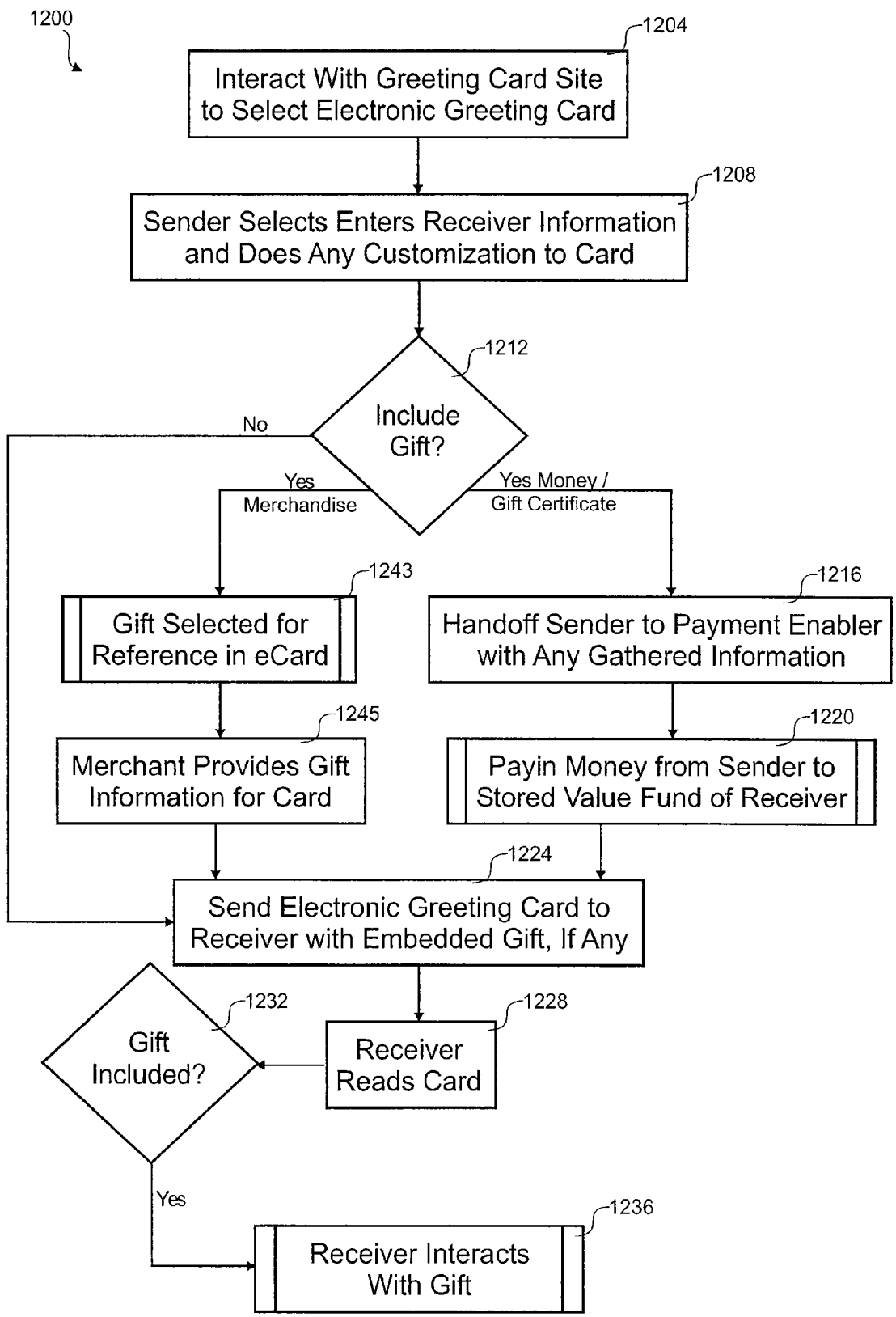
FIG. 12A is a flow diagram of an embodiment of a process for sending an electronic greeting card (eCard) that may include an electronic gift.

With reference to FIG. 12A, a flow diagram of an embodiment of a process 1200 for sending an eCard that may include an electronic gift is shown. The depicted portion of the process 1200 begins in step 1204 where the sender 110 interacts with the web interface 408 of the transfer system 190 to select the eCard. In step 1208, the sender 110 enters the e-mail address, name, and any customizations to the eCard. Customization may include devising the personalized portion 708, deciding the hot links and buttons to provide, deciding if the card should dynamically change according to the status of the gift, etc. These entries are stored in the user database 416. Where there is no electronic gift enclosed, the eCard is sent in step 1224 and read in step 1228.

Where the receiver 110 decides to include an electronic gift of money, promotional points, a gift certificate, a negotiable instrument or other gifts available from the money transfer system 190 in step 1212, processing continues to step 1216 where the sender 110 is handed-off to the payment enabler 170. Any user information is passed by the payment enabler interface 420 to the affiliate interface 333 of the payment enabler 170. This information is used to pre-populate any forms presented to the sender or later to the receiver 110, 130. In step 1220, the money is paid into the payment enabler 170 to pay for the electronic gift. If more work is required on the eCard, the sender 110 could be passed back to the eCard site 140. As the funds that paid for the gift clear or don't the eCard site can be notified of this status.

In some cases, the sender 110 may choose from step 1212 to send a gift that is referenced in the eCard 700. In step 1243, the sender chooses from a list of affiliated gift sites 142 and is handed off to that site to select the gift to reference in the eCard. Some embodiments could provide an option for manual entry of the gift information referenced in the eCard 700. The sender 110 chooses goods and/or services from the gift site 142. Information on the chosen gift is provided from the gift site 142 to the eCard site 140 in step 1245. This status information could be updated over time as the item is accepted, shipped, received, no longer returnable, out of warranty, etc.

If the eCard creation process is complete, the eCard 700 is sent by e-mail or other electronic methods to the receiver in step 1224. Some embodiments could print the card with its associated information and mail that print of the card to the sender 130. Links in the printed card could be entered by the receiver 130 to get access to the electronic version or other information on the gift. In step 1228, the receiver 130 opens the email, WAP or pager message referencing the eCard and clicks on a link in the e-mail to open a browser window directed at the web interface 408 of the eCard site 140. Some embodiments could include an executable eCard application as an attachment to the e-mail message.

If an electronic gift is included in the eCard as determined in step 1232, an icon or button appears in the eCard 700 that is clicked to direct the receiver 130 to a eCard screen 700 that informs the receiver 130 of the gift and presents the greeting of the eCard 700. This screen could include another message, information on the electronic gift, advertisements, and/or other information. The screen may give all the information necessary for redeeming the electronic gift. For example, another button may be presented entitled "redeem your gift certificate" that would forward the user to the target merchant(s) for the gift certificate. To verify identity, the target merchant would require the e-mail address for the eCard be used to configure an account. Where money is available from a stored value fund on the payment enabler 170, the receiver 130 is invited to create an account where there is none. Some money gifts from the payment enabler 170 do not require creation of an account.

Figure 12B:
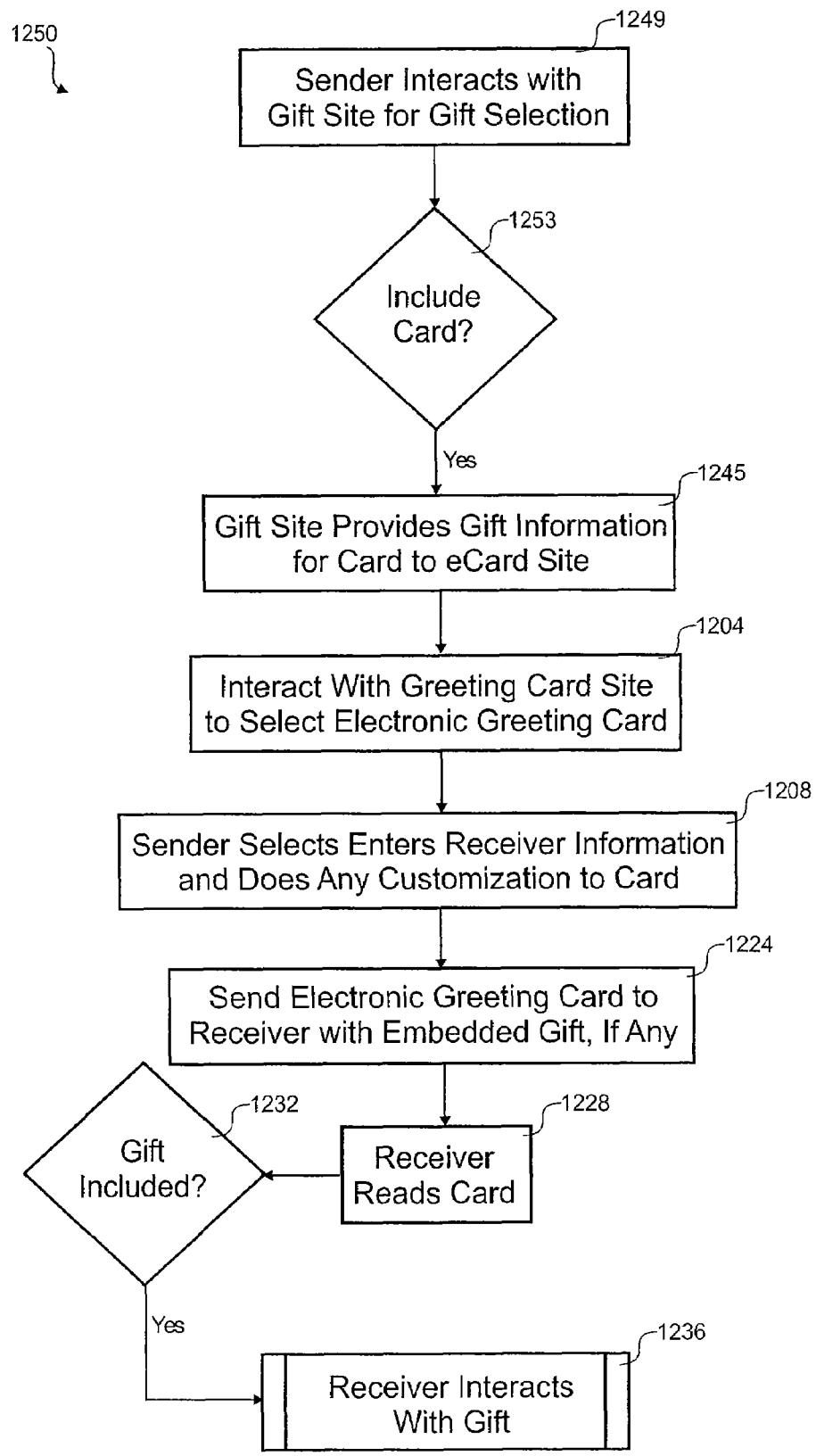
FIG. 12B is a flow diagram of another embodiment of a process for sending an eCard where the sender chooses the gift before the card.

With reference to FIG. 12B, a flow diagram of another embodiment of a process 1250 for sending an eCard 700 where the sender 130 chooses the gift before the eCard 700 is shown. The starting point for this process 1250 is the retail gift site 142 that offers an eCard option for goods and services purchased at the site 142. The depicted portion of the process 1250 begins in step 1249 where the sender interacts with the gift site 142 to select a gift. Presuming a card is desired in step 1253, processing continues to step 1245 where the gift site 142 provides gift information for the card to the eCard site 140. In the remaining steps of the process 1250, the sender 110 interacts with the gift site 142 to specify and send the card before the receiver redeems the card.

Figure 13:
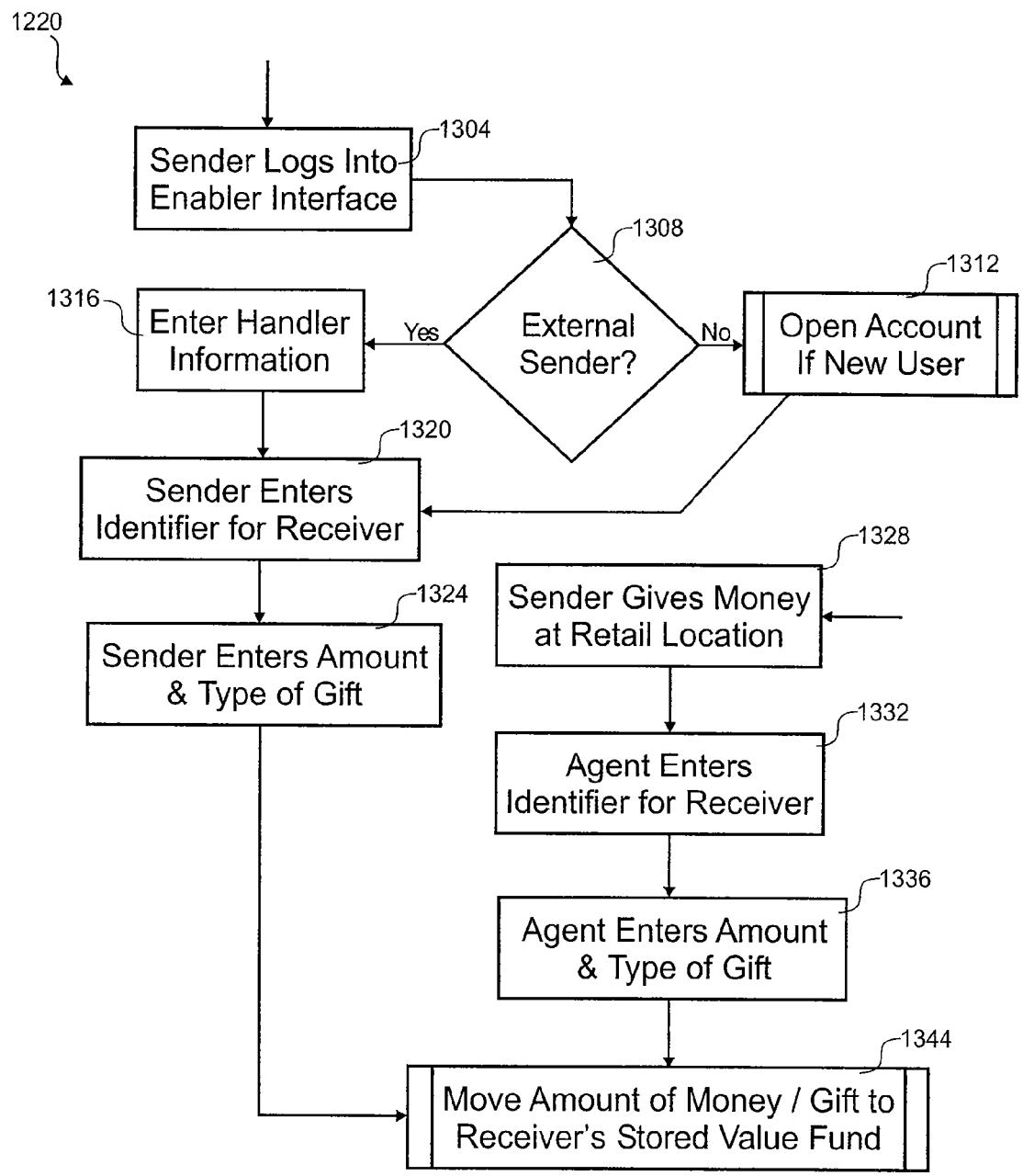
FIG. 13 is a flow diagram of an embodiment of a process for paying-in money to the payment enabler.

Referring to FIG. 13, a flow diagram of an embodiment of a process 1220 for paying-in money to the payment enabler 170 is shown. To pay for the electronic gift, money is transferred from a money handler 160 of the sender 110 to a stored value fund 1344 of the receiver 130. The stored value fund may be used only once to pay for the present gift or could be used any number of times by the receiver 130. The stored value fund is identified by the e-mail address of the receiver 130, among other ways. If a fund already exists, it may be used for the present transaction. Some embodiments could avoid the use of a stored value fund by transferring money from sender 110 to receiver 130.

In this embodiment, there are two ways in the process 1220 to fund the payment enabler 170. The first starts in step 1304 and is done through the Internet 150 or other electronic means and the second starts in step 1328 and is done at a retail location 600. Referring initially to the first way that starts in step 1304, the sender 110 logs into the enabler interface 320 after being handed-off from the eCard site 140. In some embodiments, the sender 110 may be automatically logged-in based upon information from the eCard site 140. Depending on the situation, the sender 110 may or may not need to open an account with the payment enabler 170. Where the sender 110 does not create an account for the electronic gift, the sender 110 is said to remain "external" to the transfer system 190. If the transfer is not from an external sender as determined in step 1308, an account is opened in step 1312 if there is none. For external transactions, money handler information is provided in step 1316.

An identifier is entered for the receiver in step 1320, although this step could be automatically performed with information from the eCard site. The identifier in this embodiment is the e-mail address of the receiver 130, but other identifiers could also be used in other embodiments. In step 1324, the sender is given options for the electronic gifts and the prices associated with each. The prices may include any service fees. The money is moved from the specified money handler 160 to the stored value fund of the receiver in step 1344.

The second way for the sender 110 to fund the stored value fund of the receiver begins in step 1328 where money is given at a retail location 600. The money can be in the form of a credit/debit card, negotiable instrument, promotional points, coupons, and/or cash. If the eCard 700 were already selected online and stored, the agent could access the eCard 700 to add the electronic gift. More typically, the sender would select the eCard 700 at the kiosk interface 180-2 in the retail location 600. The agent is able to pull up the eCard transaction by the identifier of the receiver 130 or other information in step 1332. With the provided money, the agent enters the desired electronic gift and the amount associated with it or pays the merchant associated with the tangible gift. In step 1344, the money is moved to the receiver's stored value fund minus any fees.

Figure 14:
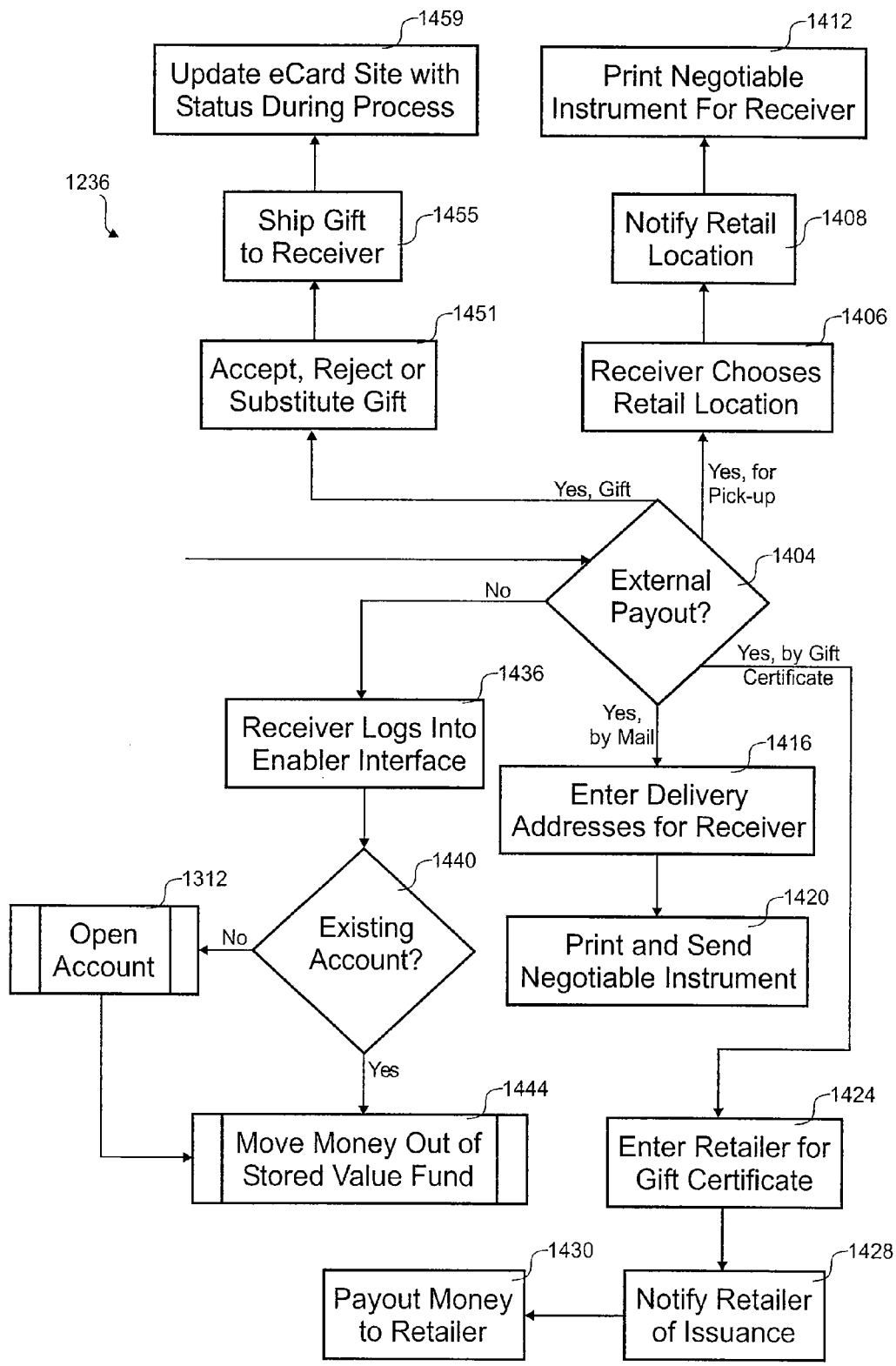
FIG. 14 is a flow diagram of an embodiment of a process for providing the gift to the receiver.

With reference to FIG. 14, a flow diagram of an embodiment of a process 1236 for providing the gift to the receiver 130 is shown. This embodiment demonstrates five different gift examples: providing a referenced gift from the gift site, payment of money to the stored value fund of the receiver, printing of a negotiable instrument for pick-up at a retail location 600, printing and delivery of a negotiable instrument to a specified address, and delivery of a gift certificate with a targeted retailer. In one option, the receiver 130 to chooses the money handler 160, while four other options are called external payouts where the money handler 160 or gift is specified by the sender. In an example of an external payout, the sender may specify a gift certificate where the money is limited to merchandise or services from specified retailer(s).

In any event, the depicted portion of the process 1236 begins in step 1404 where the types of external payouts are separated from the internal payout option. Step 1406 is the start of the external payout option where a negotiable instrument is provided to a retail location 600. After clicking on the button or icon in the eCard for the electronic gift a screen is presented with information on the electronic gift, or negotiable instrument in this case. That screen or a subsequent screen allows the receiver to find a retail location 600 that is conveniently located for pick-up of the negotiable instrument. In step 1408, that retail location is notified of the negotiable instrument and particulars on the receiver 130. These particulars may include a way to validate the identity of the receiver. For example, a test question and answer could be used to verify identity. In step 1412, the negotiable instrument is printed for the receiver 130 after any verification of identity.

The next external payout option involves mailing out a printed negotiable instrument. In step 1416, the sender 110 enters the delivery address for the receiver. The payment enabler 170 decides which money handler 160 to use to print the negotiable instrument. That money handler 160 prints and sends the negotiable instrument in step 1420.

In another external payout option, a gift certificate or store credit is forwarded to the target retailer(s) for the benefit of the receiver 130. In some embodiments, he gift certificate could be redeemable at a number of retailers, such that one of those would only get credit if the receiver 130 spent the gift certificate at the one's store. In step 1424, the sender 110 enters the target retailer into the payment enabler 170. The retailer is notified of the issuance of the gift certificate in step 1428. In step 1430, the credit is paid out to the retailer either before or after the receiver 130 purchases items with that retailer.

In the final external payout option depicted, a gift is referenced in the eCard 700. The receiver 130 accepts, reroutes and/or substitutes the gift in step 1451. The receiver 130 can track the package and receive other status information during the process. The personalized portion 708 or other portions of the eCard 700 may change in response to status changes of the gift. In step 1455, the gift is shipped to the receiver 130 so long as the gift was accepted by the receiver 130. Some embodiments could ship the gift and not give the receiver 130 an option to reject, reroute or substitute the gift. In step 1459, the status of the gift is updated on the eCard site 140 by the retail gift site 142.

With an internal payout, the receiver 130 is given the equivalent of cash that can be used in any number of ways supported by the payment enabler 170. The sender 110 may be able to choose which ways are available for a particular gift. When the electronic gift screen is opened from the eCard 700, the receiver 130 is invited to log into the payment enabler interface 420 in step 1436. As indicated in step 1440, the receiver 130 can log into an existing account or open a new account in step 1312. Once an account is logged into or created, the receiver moves the money out of their stored value fund in step 1444.

Figure 15:
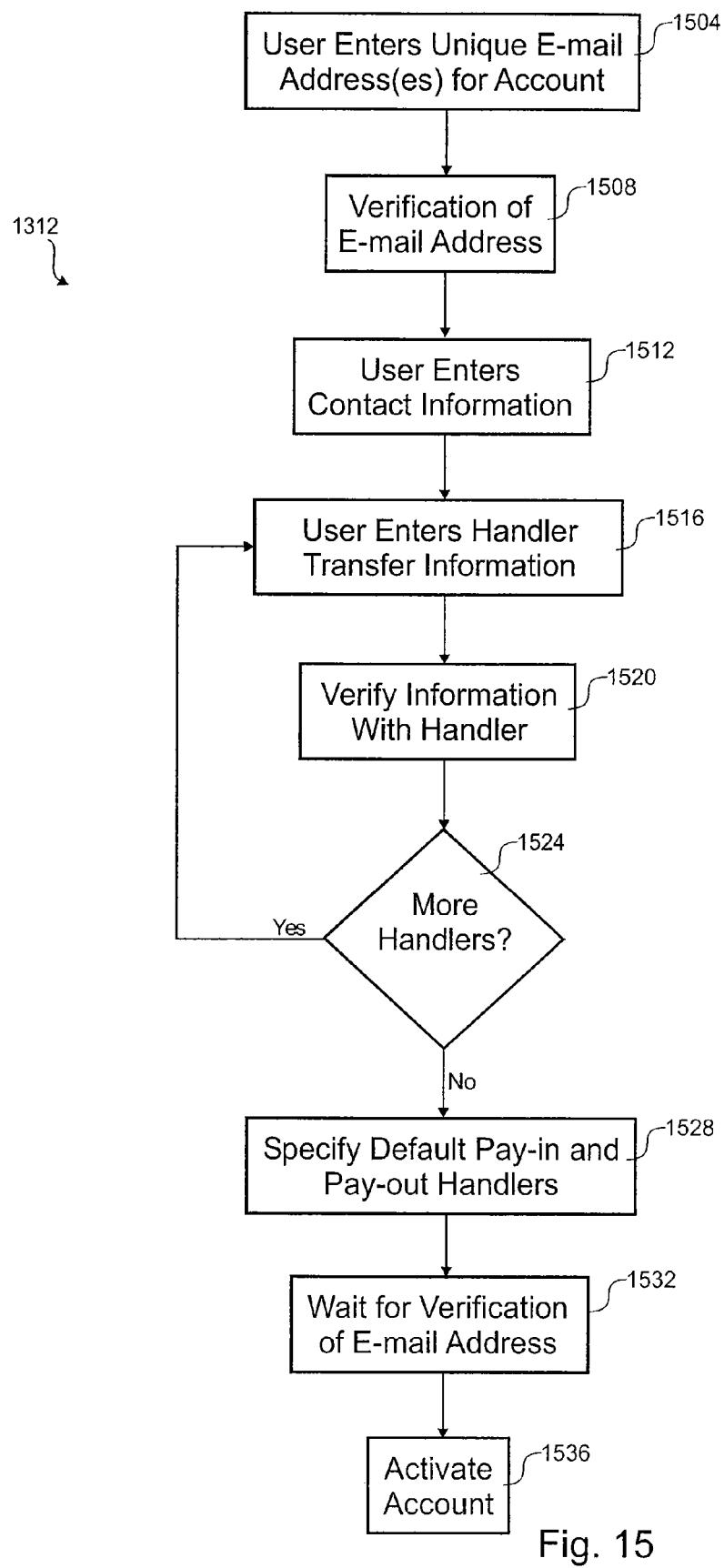
FIG. 15 is a flow diagram of an embodiment of a process for configuring a user with an account for the online money transfer system.

Referring to FIG. 15, a flow diagram of an embodiment of a process 1312 for configuring a user with an account for the online money transfer system 190 is shown. Where the receiver 130 or sender 110 is not external to the system, an account with the payment enabler 170 is created. The depicted portion of the process 1312 begins in step 1504 where the user 110, 130 enters an e-mail address as the unique identifier for the account. The user 110, 130 may want to enter any other e-mail addresses that are aliases of the user and that may be used by counter parties to a transaction. Other embodiments could use any unique identifier for the user 110, 130.

Once an e-mail address is given to the payment enabler 170, it is verified. A message is sent to the e-mail address in step 1508. A code is provided and an URL such that the user can click on the URL to load a page where the code is entered to verify the e-mail address. In this embodiment, the code is a randomly generated set of alphanumeric characters. Other embodiments could use any number of methods to verify the e-mail address.

The user 110, 130 enters contact information in step 1512. This contact information could include address, phone number, pager address, instant message address, wireless phone address, contact e-mail address, etc. In step 1516, the user enters handler interface information. For example, the user might enter credit card information and bank transfer information. In step 1520, the information is verified with the handler 160 to the extent possible for that handler 160. In step 1524, the process 612 can loop back to step 1516 for entering and verifying additional handlers.

In step 1528, a default input handler 160 and a default output handler 160 can be chosen for transferring money into and out of the system 100. These two handlers 160 may be different. In step 1532, the payment enabler 170 waits for verification at least one of the e-mail addresses before activating the account for sending and receiving money with that e-mail address in step 1536.

Figure 16:
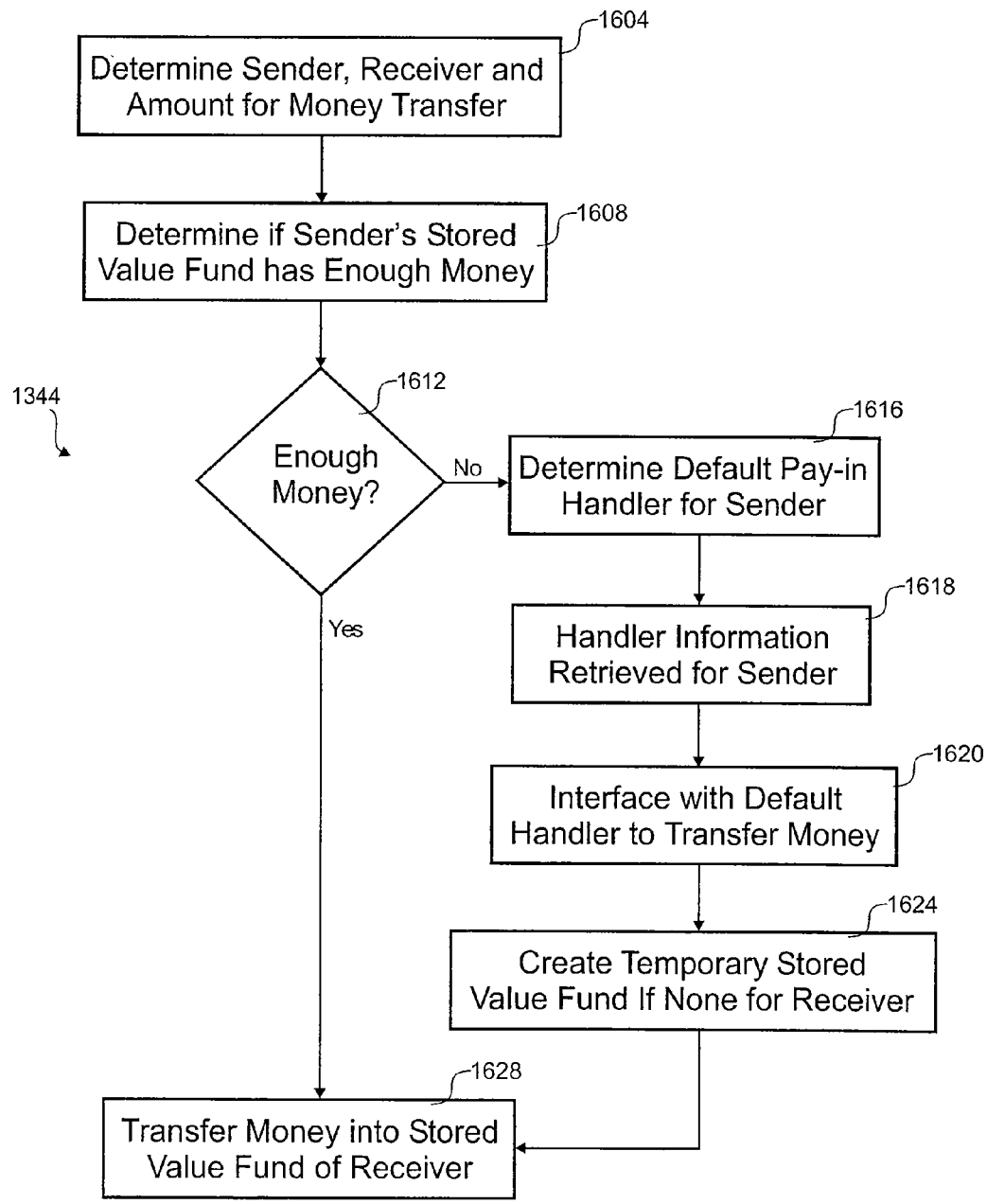
FIG. 16 is a flow diagram of an embodiment of a process for transferring money from the sender to the receiver.

With reference to FIG. 16, a flow diagram of an embodiment of a process 1344 for transferring money from the sender 110 to the receiver 130 is shown. The process 1344 describes a transfer between a single sender 110 and a single receiver 130, but a number of these processes 636 could be performed in parallel where there are a number of receivers 130. For example, a corporation could distribute eCards with electronic gifts enclosed to a class of employees or clients. The depicted portion of the process begins in step 1604 where the receiver 130, sender 110 and amount are determined for the money transfer. In step 1612, it is determined if the stored value fund of the sender 110 has enough money to fund the transfer to the receiver 130.

Where there is not sufficient funds in the stored value fund, processing continues to step 1616 to load funds. In step 1616, the default pay-in handler 160 is determined. The information used to transfer money from the handler 160 into the payment enabler 170 is retrieved from the user database 324 in step 1618. The sender 110 may be given an opportunity to change the default pay-in handler 160 for this transaction or for all further transactions. Presuming there are no changes, the default handler 160 is interfaced in step 1620 to transfer the money. If there is no stored value fund for the receiver 130, a temporary fund is created in step 1624. A temporary stored value fund can be used for a single transfer, but the receiver may want to make the temporary fund permanent by opening an account with the payment enabler 170.

Regardless of whether new money is added or whether existing money is used, processing continues to step 1628 from both step 1612 and step 1624. In step 1628, the money is attributed to the receivers 130 stored value fund to the detriment of the sender's stored value fund in step 1628. In some embodiments, the payment does not originate in the sender's stored value fund, but passes directly from the money handler 160 of the sender 110 to the stored value fund of the receiver 130. In other embodiments, the sender can select a future time that payment is made such that the payment is configured now, but completed at the future time.

Figure 17A:
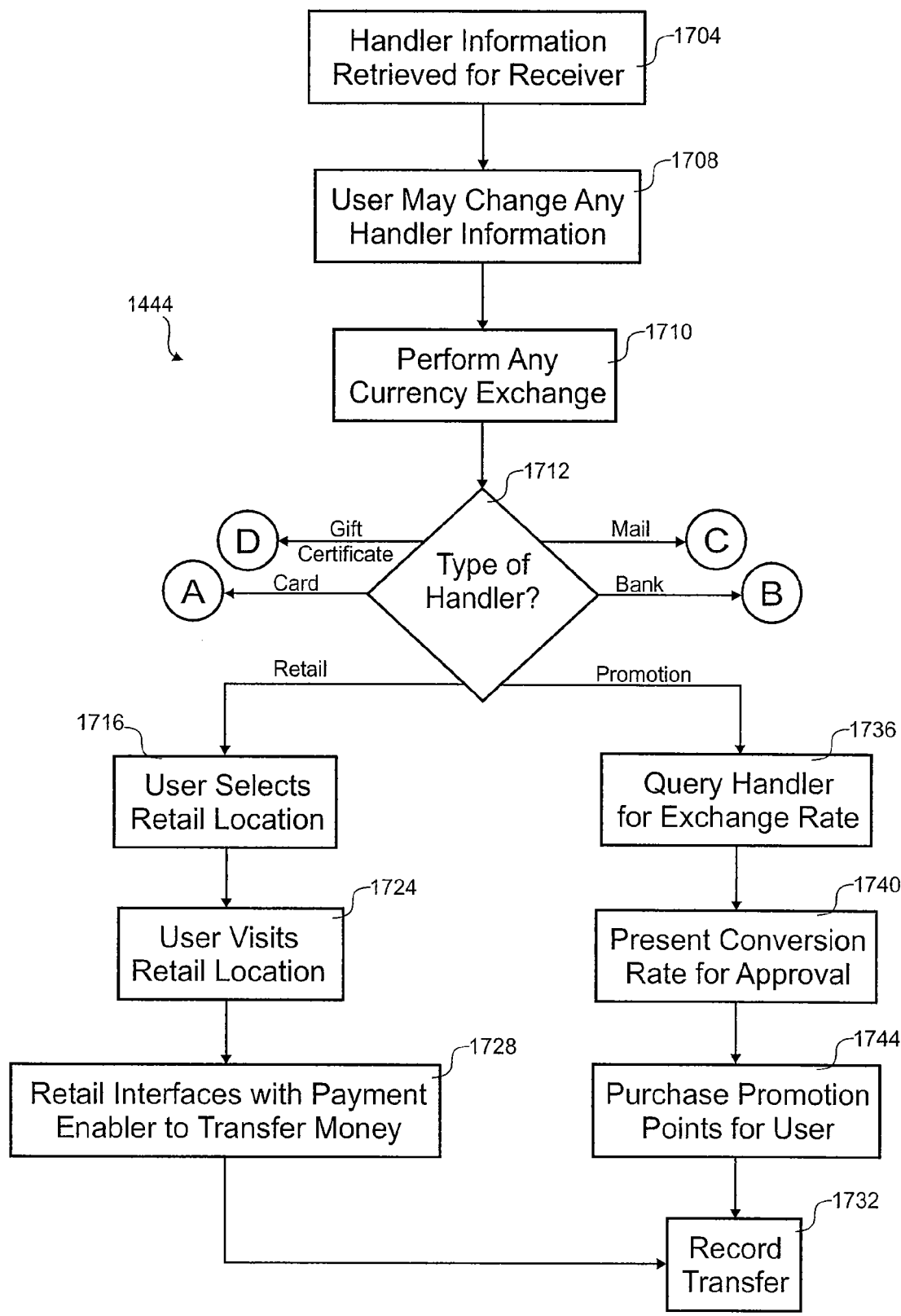
FIGS. 17A and 17B are a flow diagram of an embodiment of a process for moving money out of a stored value fund for a receiver.
Figure 17B:
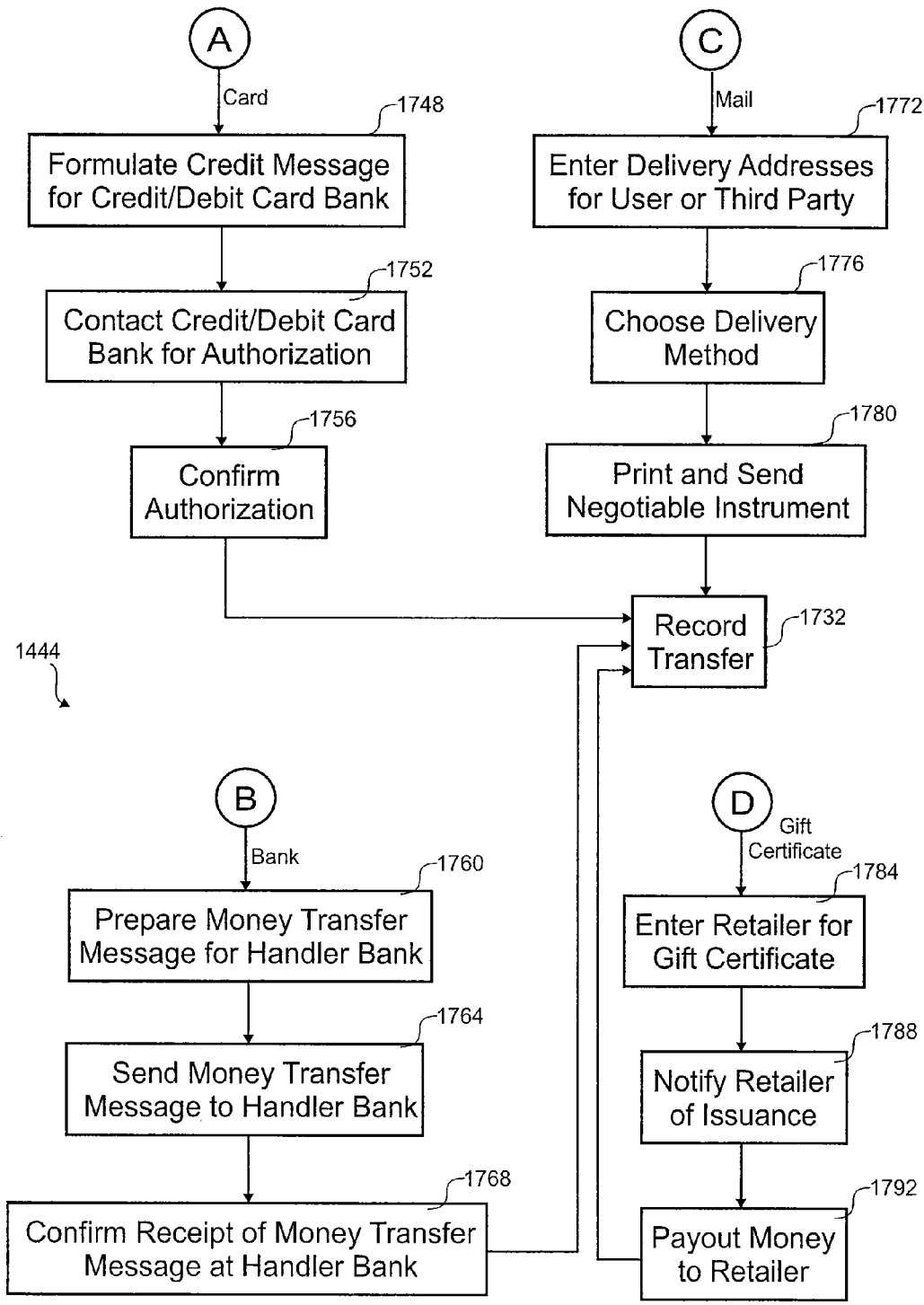

Referring to FIGS. 17A and 17B, a flow diagram of an embodiment of a process 1444 for moving money out of a stored value fund for a receiver 130 is shown. This embodiment allows paying-out money in at least six different ways, namely, by: pick-up at a retail location 600, exchanging with some promotion, a credit to a debit or credit card, a credit to a bank account, mailing a negotiable instrument, and sending an electronic gift certificate. The depicted portion of the process 1444 begins in step 1704 where the default pay-out handler information is retrieved for the receiver 130. In step 1708, a web page is presented that allows the receiver 130 to select a different handler 160 or to change information for the handler 160.

A user may have a number of different currencies of money in their stored value fund. The user may select some or all of the different currencies for paying-out. In many cases, the handler 160 only accepts money in a single currency or the user may simply wish to exchange money to another currency. In step 1710, any currency is exchanged. The exchange rate database 332 is queried for the current rate that is applied by the payment conversion function 328.

In step 1712, processing branches in one of six directions depending on the type of handler the user has chosen. The first two directions are depicted on FIG. 17A and the remainder are depicted on FIG. 17B. One branch beginning in step 1716 corresponds to the user visiting a retail location 600 to transfer out money with the assistance of the agent. In step 1716, the user selects a retail location 600 that is convenient. The user visits the retail location 600 in step 1724 to either use a kiosk interface 180-2 or use the agent. In this embodiment, the user interfaces with the agent who uses the retail interface 180-4 to the payment enabler 170. From the retail interface 180-4, the agent can transfer the money to any handler 160, can print a negotiable instrument or can provide cash to the user 130. The transfer is recorded by the payment enabler 170 in step 1732.

In another branch that begins in step 1736, a promotion program is chosen as the handler 160-1. Either the promotion handler 160-1 or the exchange rate database 332 can be queried in step 1736 to determine the exchange rate for program credits or points. In step 1740, the conversion rate is presented to the user for approval. Presuming the rate is approved, the promotion credits or points are purchased in step 1744 by interfacing with the promotion handler 160-1. The payout of money to the promotion handler 160-1 is recorded in step 1732.

In yet another branch that begins in step 1748 of FIG. 17B and is labeled "A," a credit card or debit card is used to transfer out money from the system 100. In step 1748, a credit message is formulated for the card bank. In some embodiments, the identity of the card holder may be further verified by entry of a PIN or other verification method. The card bank is contacted in step 1752 for authorization of the credit. Authorization of the credit is performed in step 1756. The payout is recorded with the payment enabler 170 in step 1732.

In the branch labeled "B," a bank transfer is used to payout money from the system 100. In step 1760, an EFT message is formulated for the handler bank 160-4. The EFT message is sent to the handler bank 160-4 in step 1764. Receipt of the EFT message is confirmed by the handler interface 308 in step 1768 and the transfer is recorded in step 1732.

In the branch of FIG. 17B labeled "C," a negotiable instrument is printed and sent to the receiver 130 or some other party. In step 1772, the user enters the delivery address and a name to pay the negotiable instrument to. The user 110, 130 can send the negotiable instrument to herself or a third party. A delivery method for sending the negotiable instrument is chosen in step 1776. In step 1780, the negotiable instrument is printed or otherwise produced and sent. The payout is recorded in the user database in step 1732.

In the last branch of FIG. 17B labeled "D," a gift certificate is used to payout the credit in the receivers stored value fund. In step 1784, a retailer(s) is chosen as a target for the gift certificate. The retailer is notified in step 1788. In step 1792, the money is paid-out to the retailer such that a store credit exists for the benefit of the receiver 130 or some other party chosen by the receiver. Some embodiments could mail a printed gift certificate that is redeemable at the retailer.

Figure 18:
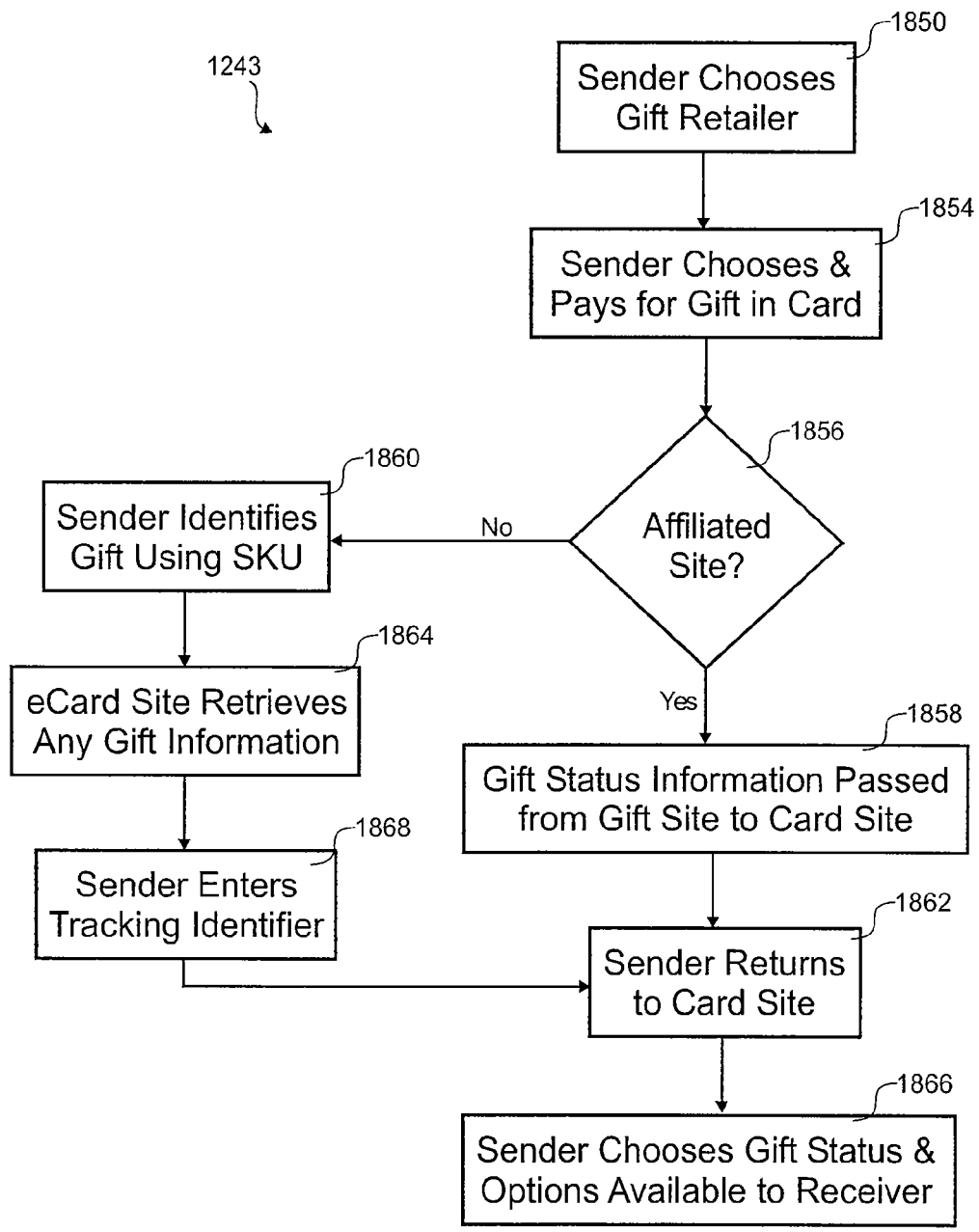
FIG. 18 is a flow diagram of an embodiment of a process for selecting a gift for reference in the eCard.

With reference to FIG. 18, a flow diagram of an embodiment of a process 1243 for selecting a gift for reference in the eCard 700 is shown. In the depicted portion of the process 1243, the sender chooses a gift retailer in step 1850. That retailer may or may not be an affiliated gift site 142. The gift is chosen and purchased in step 1854. A determination is made in step 1856 as to whether the merchant is affiliated with the eCard site 140. For those associated gift sites 142, status information is provided automatically to the eCard site in step 1858.

For gifts not originating from an affiliated gift site 142, processing goes from step 1856 to step 1860. These gifts could be new or used. In step 1860, the sender 110 identifies the gift by entering a SKU or some other identifier to be able to get product information, manufacturer information, user guides, warranty information, product reviews from a database of such information in step 1864. Where the item is unique or otherwise not available in the database, the sender can write their own description and provide links manually to other information on the gift. The sender 110 can enter a tracking number or identifier in step 1868 such that tracking information can be retrieved for the gift as it travels to the receiver. If any of this information is not currently available, the sender 110 can return later to enter it.

Regardless of whether the gift is from an affiliated gift site or not, processing continues to step 1852 where the sender returns to the gift site 142. The sender can choose in step 1866 options for the eCard 700. Options include allowing returns, allowing exchanges, providing tracking, allowing reroutes, assisting resale, assisting repair, etc. as demonstrated in FIGS. 7A through 11. The sender 110 can also specify whether and how the eCard 800 can dynamically respond to the status of the gift.

While the principles of the invention have been described above in connection with specific apparatuses and methods, it is to be clearly understood that this description is made only by way of example and not as limitation on the scope of the invention.

What is claimed is:

1. A method of creating an electronic greeting card incorporating a gift, the method comprising:
    generating a first user interface allowing a user to select an electronic greeting card from a plurality of greeting cards, and to customize at least part of the selected electronic greeting card;
    generating a second user interface allowing the user to select a gift from a plurality of gift types;
    embedding a first link in the customized electronic greeting card to facilitate retrieval of the selected gift, the first link including a code indicative of the selected gift;
    electronically transmitting with a computer system first version of the customized electronic greeting card with the embedded link to a receiver identified by the user, the first version comprising a greeting portion and a first personalized portion;
    receiving a communication from the receiver in response to the customized electronic gift card with the embedded link; and
    electronically transmitting with a computer system a second version of the customized electronic greeting card to the receiver, the second version comprising the greeting portion and a second personalized portion, the second personalized portion including a modification from the first personalized portion responsive to the communication from the receiver.

2. The method of claim 1, further comprising:
    receiving a fee from a money handler,
    wherein the second user interface includes an interface to allow the user to select the money handler from a plurality of money handlers for payment for the selected gift.

3. The method of claim 1, wherein,
    the second user interface includes an interface to allow the user to select a future time for the electronically transmitting step.

4. The method of claim 1, further comprising:
    generating a third user interface to allow the user to input first identity verification information to be used to verify the identity of the receiver;
    embedding a second link in the first version of the customized electronic greeting card to a site allowing the receiver to input second identity information; and
    processing the first and the second identity information to validate identity of the receiver.

5. The method of claim 1, wherein, the first user interface comprises a link to an electronic greeting card site to allow the user to customize a selected electronic greeting card.

6. The method of claim 1, wherein,
    the second user interface comprises links to a plurality of different affiliated gift sites, wherein a first gift type is selectable from a first site of the plurality of different affiliated gift sites, and a second gift type is selectable from a second site of the plurality of different affiliated gift sites.

7. The method of claim 1 wherein the first personalized portion and the second personalized portion comprise the customized part of the customized electronic greeting card, and the greeting portion does not comprise the customized part of the electronic greeting card.

8. The method of claim 1, further comprising:
    receiving an indication of acceptance of the gift from the receiver via the first link,
    wherein the second version of the customized electronic greeting card is electronically transmitted via a second link, the second link comprising shipping status information about the accepted gift.

9. The method of claim 1, wherein the first link comprises a uniform reference locator related to the gift.

10. The method of claim 1, wherein the first user interface and the second user interface each comprise a plurality of interfaces.

11. The method of claim 1, wherein the gift types include at least two of: a credit in a stored value fund, a foreign currency credit in the stored value fund, a prepaid credit or debit card, a prepaid phone card, promotional points, airline mileage credits, a gift certificate for one or more retailers, a printed negotiable instrument, and a tangible gift.

12. A method of creating an electronic greeting card incorporating a gift from among a plurality of gift sites, the method comprising:
- generating a first user interface linking a user to an electronic greeting card site to allow the user to customize a selected electronic greeting card;
- generating a second user interface providing links to a plurality of different affiliated gift sites, the links allowing the user to select a gift from a gift site of the plurality;
- embedding a link in the customized electronic greeting card to facilitate retrieval of information about the selected gift, the link including a code indicative of the selected gift;
- electronically transmitting with a computer system a first version of the customized electronic greeting card with the embedded link to a receiver identified by the user the first version comprising a greeting portion and a first personalized portion;
- receiving a communication from the receiver in response to the customized electronic gift card with the embedded link; and
- electronically transmitting with a computer system a second version of the customized electronic greeting card to the receiver the second version comprising the greeting portion and a second personalized portion the second personalized portion comprising a modification from the first personalized portion responsive to the communication from the receiver.

13. The method of claim 12, wherein the code comprises code for one or more of the following:
- product information for the selected gift;
- retailer information on a seller of the selected gift;
- manufacturer information on a producer of the selected gift;
- a product review for the selected gift;
- a safety rating for the selected gift;
- a content rating for the selected gift;
- tracking information of a shipper of the selected gift;
- warranty information of the selected gift;
- product recall information of the selected gift;
- frequently asked questions related to the selected gift;
- care instructions for the selected gift; and
- retrieval of the selected gift.

14. The method of claim 13, wherein the code comprises code for retrieval of the selected gift.

15. A method of creating a dynamic electronic greeting card incorporating a gift selected by a user, the method comprising:
- embedding a code indicative of a user selected gift in a customized electronic greeting card;
- electronically transmitting with a computer system a first version of the customized electronic greeting card with the embedded code to a receiver identified by the user, the first version comprising a greeting portion and a first personalized portion;
- receiving a communication from a the receiver in response to the customized electronic gift card with the embedded code; and
- electronically transmitting with a computer system a second version of the customized electronic greeting card to the receiver, the second version comprising the greeting portion and a second personalized portion, the second personalized portion including a modification from the first personalized portion responsive to the communication from the receiver.

16. The method of claim 15, further comprising:
electronically transmitting a user interface allowing the user to select a gift from a plurality of gift types.

17. The method of claim 16, further comprising:
generating the user interface comprising links to a plurality of different affiliated gift sites, wherein a first gift type is selectable from a first site of the plurality of different affiliated gift sites, and a second gift type is selectable from a second site of the plurality of different affiliated gift sites.

18. The method of claim 15, further comprising:
electronically transmitting a user interface allowing a user to select an electronic greeting card from a plurality of greeting cards, and to customize a portion of the selected electronic greeting card to produce the customized electronic greeting card.

19. The method of claim 15, further comprising:
embedding a link in the first version of the customized electronic greeting card to facilitate retrieval of information about the selected gift.

20. The method of claim 15, further comprising:
embedding a first link in the first version of the customized electronic greeting card to facilitate retrieval of the gift, the first link comprising the embedded code.

21. The method of claim 20, wherein, the communication is received from the receiver via the first link.

22. The method of claim 20, wherein,
- receiving the communication step comprises receiving an indication of acceptance of the gift from the receiver via the first link; and
- electronically transmitting the second version step comprises electronically transmitting the customized electronic greeting card with a second link, the second link comprising a link to shipping status information about the accepted gift.

23. The method of claim 15, further comprising:
- electronically transmitting a user interface to allow the user to select a money handler from a plurality of money handlers for payment for the user selected gift; and
- receiving a fee from the selected money handler.

24. The method of claim 15, further comprising:
electronically transmitting a user interface to allow the user to select a future time for electronically transmitting the first version of the customized electronic greeting.

25. The method of claim 15, further comprising:
- generating a user interface to allow the user to input first identity verification information to be used to verify the identity of the receiver;
- embedding, in the first version of the customized electronic greeting card, a link to a site allowing the receiver to input second identity information; and
- processing the first and the second identity information to validate identity of the receiver.

26. A system for creating an electronic greeting card incorporating a gift, the system comprising:
- a gift site configured to allow a user to select a gift from a plurality of gift types; and
- an electronic greeting card site configured to:
  - generate a first user interface to allow the user to select an electronic greeting card from a plurality of greeting cards and to customize a portion of the selected electronic greeting card;
  - embed a first link in the customized electronic greeting card to facilitate retrieval of information about the selected gift, the first link including a code indicative of the selected gift;

electronically transmit a first version of the customized electronic greeting card with the embedded link to a receiver identified by the user, the first version comprising a greeting portion and a first personalized portion;

receive a communication from the receiver in response to the customized electronic gift card with the embedded link; and electronically transmit a second version of the customized electronic greeting card to the receiver, the second version comprising the greeting portion and a second personalized portion, the second personalized portion comprising a modification from the first personalized portion responsive to the communication from the receiver.

27. The system of claim 26, wherein, the electronic greeting card site is further configured to embed a second link in a second user interface to a plurality of money handlers selectable by the user for payment for the selected gift.

28. The system of claim 26, further comprising:

a plurality of different affiliated gift sites each configured to allow the user to select a gift, wherein the electronic greeting card site is further configured to embed a link in the customized electronic greeting card to facilitate retrieval of information about a gift selected by the user from a site of the plurality of different affiliated gift sites.

* * * * *